(12) United States Patent
Nishikawa

(10) Patent No.: US 9,658,843 B2
(45) Date of Patent: May 23, 2017

(54) DISTRIBUTION SYSTEM AND ITS CONTROL METHOD

(71) Applicant: CANON KABUSHIKI KAISHA, Tokyo (JP)

(72) Inventor: Satoshi Nishikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 341 days.

(21) Appl. No.: 14/589,568

(22) Filed: Jan. 5, 2015

(65) Prior Publication Data

US 2015/0205597 A1 Jul. 23, 2015

(30) Foreign Application Priority Data

Jan. 20, 2014 (JP) ................................. 2014-008078

(51) Int. Cl.
G06F 9/44 (2006.01)
G06F 9/445 (2006.01)

(52) U.S. Cl.
CPC .................. *G06F 8/65* (2013.01); *G06F 8/60* (2013.01); *G06F 8/665* (2013.01); *G06F 8/70* (2013.01)

(58) Field of Classification Search
None
See application file for complete search history.

(56) References Cited

U.S. PATENT DOCUMENTS

| | | | |
|---|---|---|---|
| 6,675,382 B1 * | 1/2004 | Foster | G06F 8/61 707/999.001 |
| 8,804,168 B2 | 8/2014 | Nishikawa | 358/1.15 |
| 8,869,142 B2 * | 10/2014 | Gouge | G06F 21/51 717/169 |
| 8,943,495 B2 | 1/2015 | Nishikawa | 717/175 |
| 2007/0214453 A1 * | 9/2007 | Dive-Reclus | G06F 8/61 717/175 |
| 2012/0084767 A1 * | 4/2012 | Ishimoto | G06F 8/65 717/173 |

FOREIGN PATENT DOCUMENTS

JP 2009-157732 A 7/2009

* cited by examiner

*Primary Examiner* — Lewis A Bullock, Jr.
*Assistant Examiner* — Mark Gooray
(74) *Attorney, Agent, or Firm* — Fitzpatrick, Cella, Harper & Scinto

(57) ABSTRACT

Provided is a distribution system that accepts registration of a firmware package including information about firmware which is common to a plurality of types of network devices, information about firmware which is unique to each of the plurality of types of network devices, and information about special firmware which is unique to each of the plurality of types of network devices and a specific purpose; accepts a setting file describing control information for controlling approval/denial of an automatic update of firmware included in the package; and accepts setting information relating to an automatic update from a network device. The distribution system automatically distributes information about firmware which is updatable to a network device in accordance with control information and setting information.

11 Claims, 18 Drawing Sheets

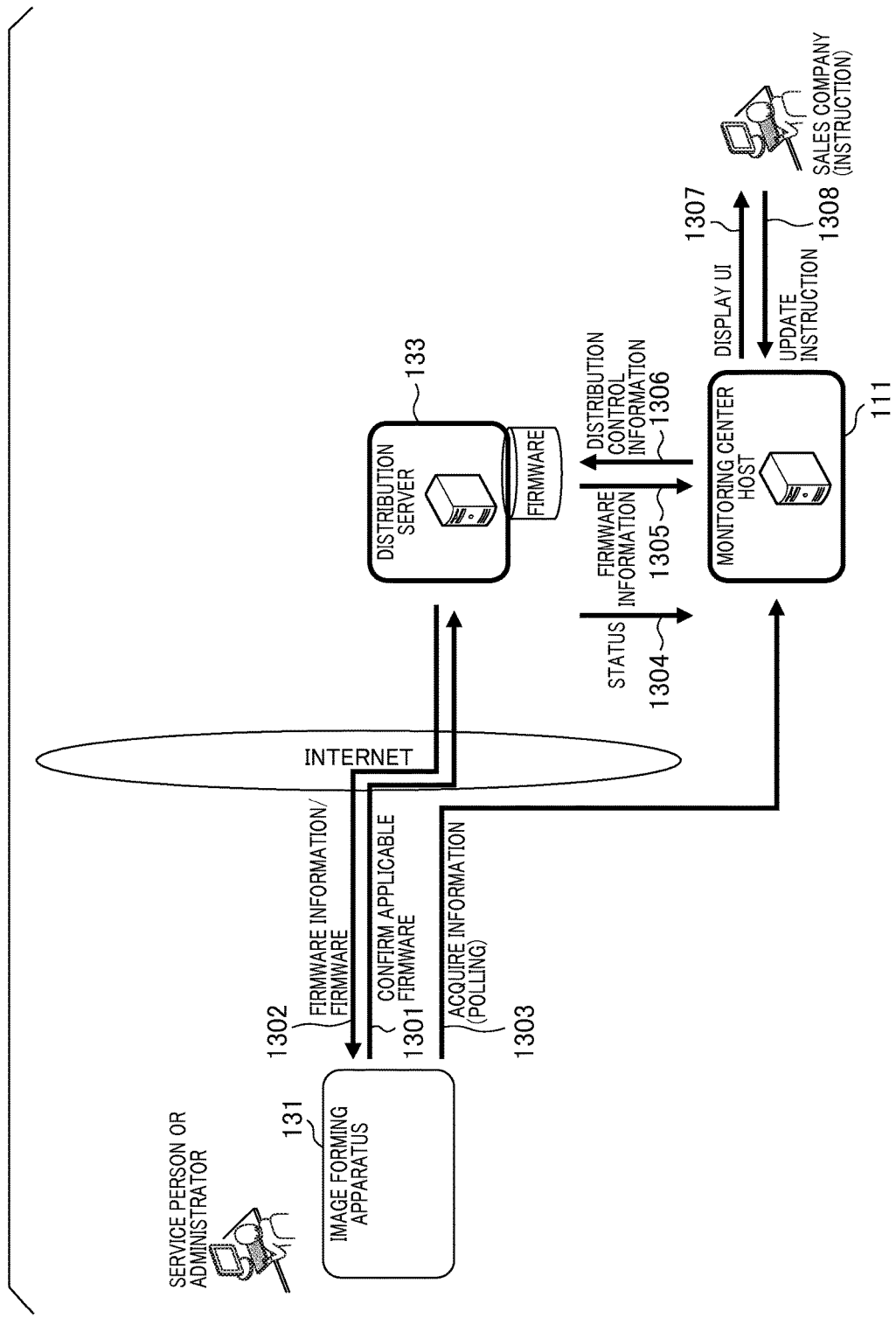

FIG. 8

- Image forming apparatus identifier
- Current firmware configuration information list 1401
  - Firmware type (Identifier representing component of firmware)
  - Firmware version
- Acquisition information
  - Acquisition type (Total/Specific/Latest)
  - Additional set acquisition mode (All/Must only)
  - Specific firmware acquisition information
    - ID
    - Password
  - Operator section (Service person/User/Periodic update)
  - Country information running on image forming apparatus
    - Language code
    - Country code
  - Regional code at which image forming apparatus is installed

FIG. 9

- Firmware information list
  - Basic set information
    - Basic set ID
    - Firmware group version 1501
    - Firmware label 1502

FIG. 10

| Status | Operation mode | Firmware change status | Periodic update | Download |
|---|---|---|---|---|
| Release to market | Reserved by monitoring center host | – | – | Active |
| Release to market | Device (Manual) | – | – | Active |
| Release to market | Device (Periodic update) | Individual portion | – | Inactive |
| Release to market | Device (Periodic update) | Common portion only | Denial | Inactive |
| Release to market | Device (Periodic update) | Common portion only | Approval | Active |
| Suspended in market | – | – | – | Inactive |

601　602　603　604　605

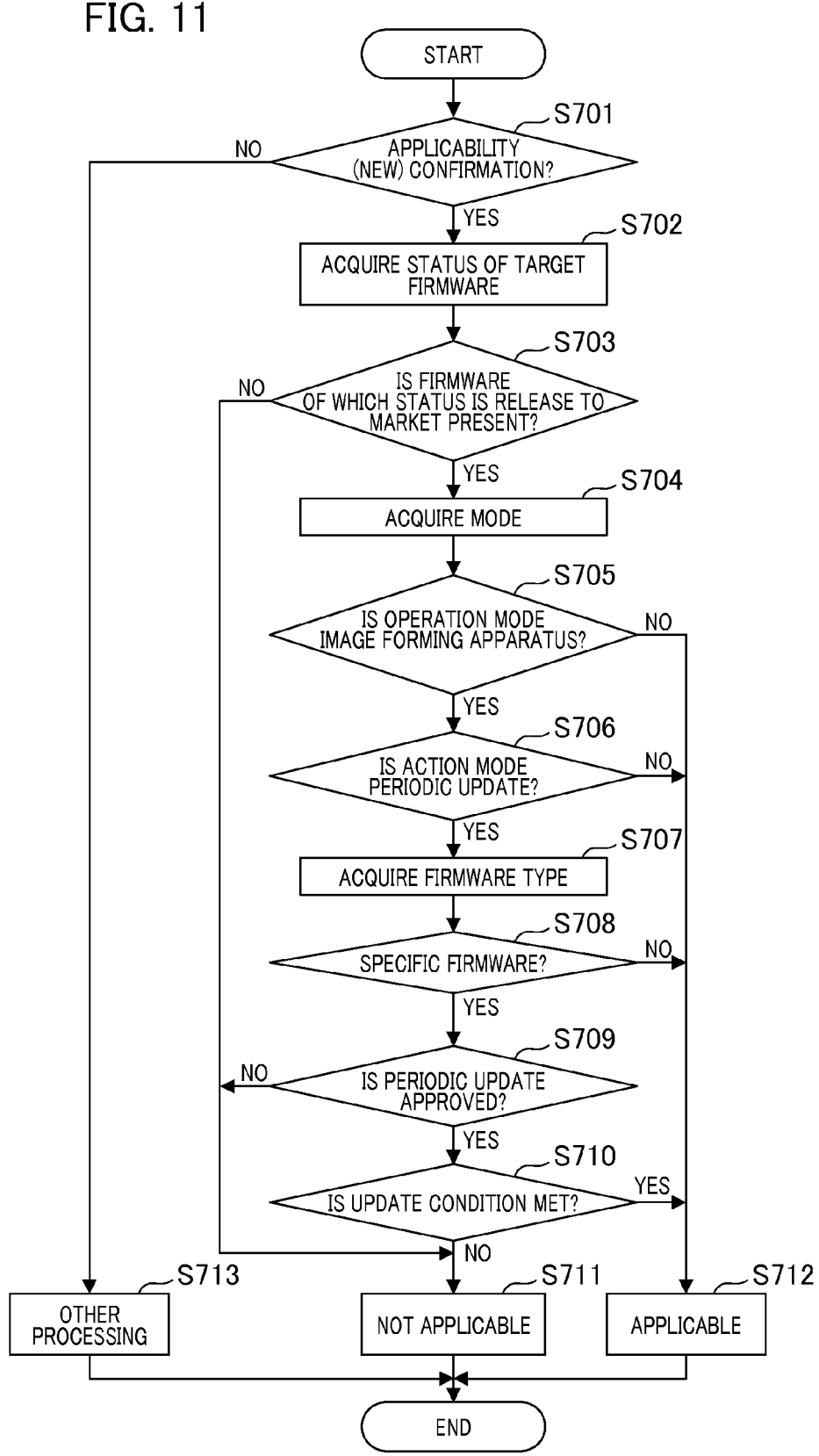

DISTRIBUTION SYSTEM AND ITS CONTROL METHOD

BACKGROUND OF THE INVENTION

Field of the Invention

The present invention relates to a distribution system that manages firmware to be distributed to an image forming apparatus and its control method.

Description of the Related Art

Upon improvement in image processing function or occurrence of a failure, an image forming apparatus that provides functions such as image processing updates firmware which is used by a controller mounted on the image forming apparatus. An update of firmware is performed by distributing new firmware by a distribution server via the Internet, using an update tool via a USB or an intranet, or the like. When using a distribution server, an administrator of the image forming apparatus or a service person who distributes firmware specifies an image forming apparatus to which firmware is to be distributed on a Web screen and sets a distribution date and time to thereby perform firmware distribution via the Internet. A distribution server may distribute firmware to tens of thousands of image forming apparatus on a remote basis or may also update firmware on a frequency of once a week at regular intervals.

However, when the latest firmware is distributed, the amount of memory to be consumed for realizing the same function or the like increases, resulting in an occurrence of characteristic deterioration such as an increase in run time of the operation of new firmware. Thus, a distribution server that temporarily attempts to use the latest firmware to confirm that the latest firmware functions normally and then distributes the firmware is considered. For example, Japanese Patent Laid-Open No. 2009-157732 discloses a distribution server that distributes the latest firmware when a predetermined number of devices or more has already succeeded in their attempts with reference to attempt history data of software to be distributed without unconditionally attempting to use the latest software.

In the Internet distribution of the above firmware, it is contemplated that a plurality of firmwares is registered as one package in a distribution server and the distribution server manages and updates the respective firmwares. The package includes, for example, normal firmware, firmware which is common to a plurality of types of devices, firmware which is unique to the types of devices such as business negotiation firmware or the like. Here, business negotiation firmware is frequently released as in normal firmware by changing the version of firmware which is common to devices. However, in contrast to normal firmware, specific firmware such as business negotiation firmware can only be updated manually by a service person in the current market.

SUMMARY OF THE INVENTION

The present invention provides a distribution system that registers a package including a plurality of firmwares of image forming apparatuses and controls an automatic update of specific firmware based on information indicating whether or not an update of specific firmware is permitted.

According to an aspect of the present invention, a distribution system is provided that includes a first acceptance unit configured to accept registration of a firmware package including information about firmware which is common to a plurality of types of network devices, information about firmware which is unique to each of the plurality of types of network devices, and information about special firmware which is unique to each of the plurality of types of network devices and a specific purpose; a second acceptance unit configured to accept a setting file describing control information for controlling approval/denial of automatic update of firmware included in the package with respect to a network device to which the special firmware is applied upon the registration; a third acceptance unit configured to accept setting information relating to automatic update from the network device to which the special firmware is applied; a management unit configured to manage information about approval/denial of distribution of firmware in accordance with control information described in the setting file and the setting information; and a control unit configured to control to distribute information about firmware which is updatable when the management unit manages information indicating that firmware is updatable upon reception of a request regarding an update of the firmware from the network device to which the special firmware is applied.

According to the present invention, a distribution system that registers a package including a plurality of firmwares of image forming apparatuses and controls an automatic update of specific firmware based on information indicating whether or not an update of specific firmware is permitted may be provided. Thus, even specific firmware is efficiently updated without requiring a manual operation by a service person, resulting in a reduction in costs.

Further features of the present invention will become apparent from the following description of exemplary embodiments with reference to the attached drawings.

BRIEF DESCRIPTION OF THE DRAWINGS

FIG. 7 is a diagram illustrating the flow of processing performed by a system in one embodiment.

FIG. 8 is a diagram illustrating an example of data to be transmitted to a distribution server by an image forming apparatus.

FIG. 9 is a diagram illustrating an example of data to be transmitted to an image forming apparatus by a distribution server.

FIG. 10 is a table storing information relating to release and suspension of firmware.

FIG. 11 is a flowchart illustrating a periodic update performed by a distribution server.

DESCRIPTION OF THE EMBODIMENTS

First Embodiment

Figure 1:
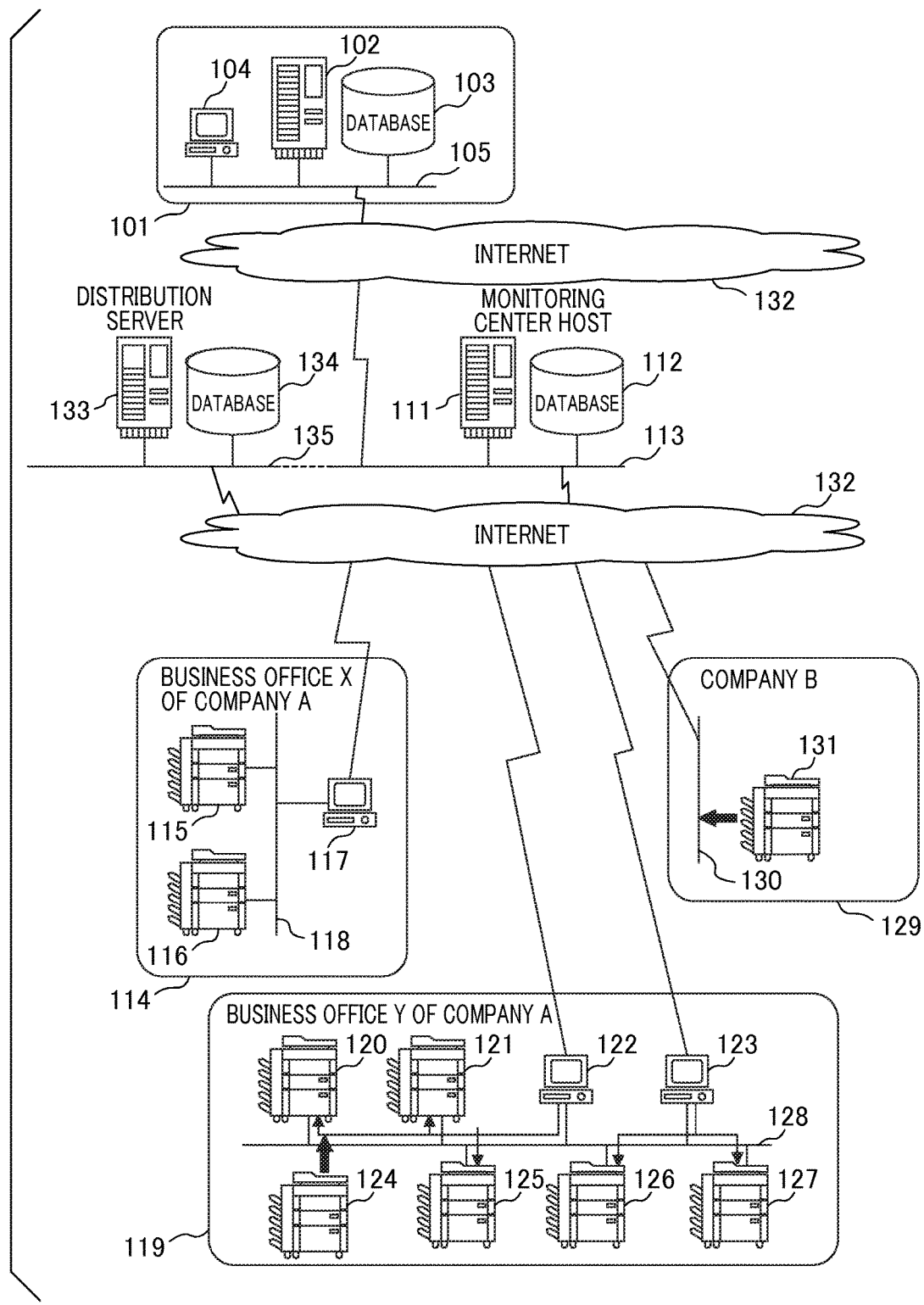
FIG. 1 is a diagram illustrating an example of an overall configuration of a network system according to one embodiment of the present invention.

Hereinafter, embodiments of the present invention will be described with reference to the drawings. FIG. 1 is a diagram illustrating an example of a configuration of a network system according to one embodiment of the present invention. In the example shown in FIG. 1, the network system includes a system 101, a monitoring center host 111, a distribution server 133, and customer systems 114, 119, and 129. The devices are communicable with each other via a network 132. In this example, the network 132 is the Internet.

Firstly, a description will be given of the system 101. The system 101 includes a PC 104, a host computer (hereinafter referred to as "host") 102, and a database 103. The PC 104, the host 102, and the database 103 are connected to each other via a LAN 105. The PC 104 controls data registration in the database 103, data modification, and the like. The PC 104 also accesses the Web site provided by the monitoring center host 111 to browse data or the like.

While the system 101 shown in FIG. 1 is configured by a plurality of devices, the system 101 may also be configured by a single device as long as it can achieve the functions to be described below. For example, the database 103 may be physically present in the host 102. Furthermore, the database 103 may be present at other locations via the Internet provided that the database 103 is accessible from the host 102. In other words, the system 101 may be configured by a plurality of devices or may also be configured by a single device.

Next, a description will be given of the monitoring center host 111. The monitoring center host 111 is a monitoring system that has a database 112 and monitors image forming apparatuses. The monitoring center host 111 has the functions of collecting, accumulating, processing the information of the image forming apparatuses to be monitored and the information indicating the operating state thereof from monitoring devices 117, 122, and 123 and the respective image forming apparatuses, and externally providing a warning and the like. The database 112 is database that functions as a history storage unit configured to accumulate information for monitoring an image forming apparatus, an operating state, or the like. The monitoring center host 111 is connected to the database 112 via a LAN 113, and the LAN 113 is connected to the Internet 132.

Note that the database 112 may be physically present in the monitoring center host 111. Furthermore, provided that the database 112 is accessible from the monitoring center host 111, the database 112 may be present at other locations via the Internet.

Next, a description will be given of the distribution server 133. The distribution server 133 is a distribution system that distributes firmware or the like to be applied to an image forming apparatus to the image forming apparatus via the network 132. A database 134 is database that functions as a storage unit configured to accumulate firmware to be applied to an image forming apparatus. The distribution server 133 is connected to the database 134 via a LAN 135, and the LAN 135 is connected to the Internet 132.

Note that the database 134 may be physically present in the distribution server 133. Furthermore, provided that the database 134 is accessible from the distribution server 133, the database 134 may be present at other locations via the Internet 132. The LAN 113 and the LAN 135 may be formed as a single LAN so as to share data with the database 134 and the database 112.

In FIG. 1, only one each of the monitoring center host 111, the database 112, the distribution server 133, and the database 134 is illustrated. However, there is also a case in practice that a plurality of monitoring center hosts and databases are used for executing distribution processing in order to perform information collection from many image forming apparatuses and monitoring devices and load sharing for distribution of firmware.

Next, a description will be given of a customer-side system configuration. A plurality of different environments is present as a customer-side environment. A network system shown in FIG. 1 includes customer systems 114, 119, and 129. In the customer system 114 (the business office X of company A), image forming apparatuses 115 and 116 that are connected to a LAN 118 connected to the Internet are monitored by the monitoring device 117, and the monitoring device 117 communicates with the monitoring center host 111 via the Internet. On the other hand, in the customer system 119 (the business office Y of company A), image forming apparatuses on a LAN 128 are managed by the monitoring devices 122 and 123. The monitoring device 122 manages image forming apparatuses 120, 121, 124, and 125 and the monitoring device 123 manages image forming apparatuses 126 and 127.

In the customer system 129 (company B), an image forming apparatus 131 itself that is connected to a LAN 130 connected to the Internet directly communicates with the monitoring center host 111 via the Internet. The image forming apparatus 131 has the same function as that of the monitoring devices 117, 122, and 123 and transmits operational information about itself to the monitoring center host 111.

The following points need to be noted.
(1) The HTTP/SOAP protocol may be utilized in the communication via the Internet in the aforementioned configuration. SOAP is an abbreviation for Simple Object Access Protocol. The SOAP is a protocol for calling data or service stored in one computer from another computer based on XML (eXtended Markup Language). In the present embodiment, the SOAP is implemented on HTTP. In the communication by the SOAP, SOAP messages including an XML document to which associated information has been added are exchanged. Accordingly, a computer that supports the SOAP includes a SOAP message generation unit for generating a SOAP message and a SOAP message interpretation unit for interpreting the SOAP message. In the present embodiment, status information about an image forming apparatus is transmitted to the monitoring center host 111 by a SOAP message.

(2) Each image forming apparatus of company A communicates with the monitoring center host 111 via the monitoring device 117. However, as in the image forming apparatus 131 installed at company B, image forming apparatuses of company A can communicate with a monitoring center host without through a monitoring device by changing the settings of the apparatuses.

<Hardware Configuration>

Figure 2:
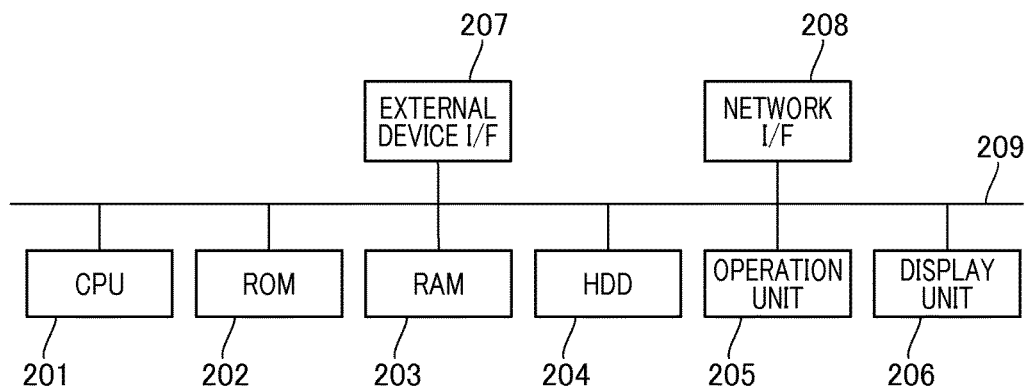
FIG. 2 is a diagram illustrating a hardware configuration of a monitoring center host, a distribution server, a host, a monitoring device, and a PC.

FIG. 2 is a diagram illustrating a hardware configuration of the monitoring center host 111. The hardware configuration of the distribution server 133, the host 102, the monitoring devices 117, 122, and 123, and the PC 104 is the same as that of the monitoring center host 111.

The monitoring center host 111 includes a CPU 201, a ROM 202, a RAM 203, an HDD 204, an operation unit 205, a display unit 206, an external device 207, and a Network I/F 208. The respective processing units are connected to each other via a system bus 209. In FIG. 2, the CPU (Central Processing Unit) 201 controls the entire monitoring center host 111. The ROM (Read Only Memory) 202 is a non-rewritable storage unit and stores a program and data related to processing executed by the monitoring center host 111. The RAM (Random Access Memory) 203 is a rewritable storage unit that electrically stores temporary data related to processing executed by the monitoring center host 111. The HDD (Hard Disk Drive) 204 stores a program and data related to processing executed by the monitoring center host 111, temporary data, information about the image forming apparatus to be monitored, information collected from the image forming apparatus, and the like. For example, operational information or the like is stored in the hard disk 204.

In the case of the monitoring center host 111, the HDD 204 has the function units shown in FIG. 4 to be described below. Likewise, in the case of the distribution server 133, the HDD 204 has the function units shown in FIG. 4 to be described below. The CPU 201 of each device uses the RAM 203 as a temporal storage region and calls and executes the program stored therein.

The operation unit 205 is a keyboard and a pointing device for receiving an instruction input to the monitoring center host 111. The display unit 206 displays the operational status of the monitoring center host 111 and information output by each program running on the monitoring center host 111. The Network I/F (Interface) 208 is connected to LAN and the Internet 132 via a network to exchange information with an external apparatus. The external device I/F 207 connects an external storage device or the like. These elements are connected to each other via the system bus 209 for data exchange.

Figure 3:
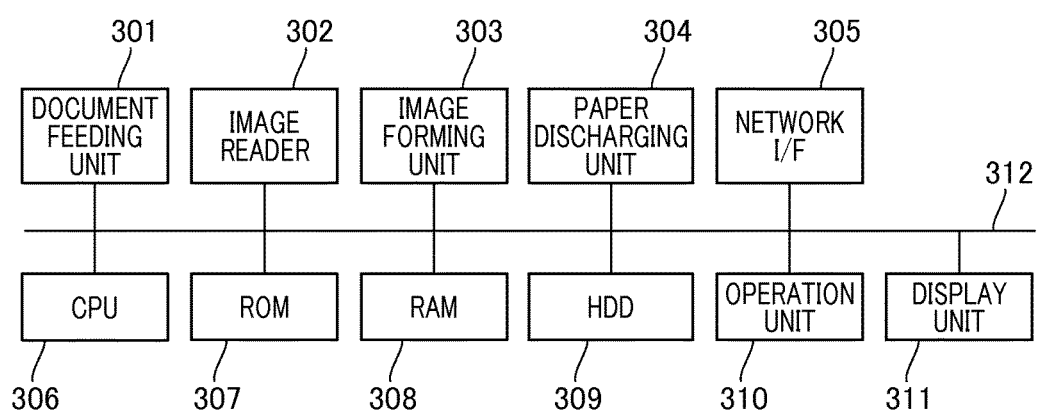
FIG. 3 is a diagram illustrating a hardware configuration of each image forming apparatus.

FIG. 3 is a diagram illustrating a hardware configuration of each of the image forming apparatuses 115, 116, 120, 121, 124, 125, 126, 127, and 131 that function as network devices. In the example shown in FIG. 3, a description will be given by taking an example of the image forming apparatus 131. Examples of the image forming apparatus include a multifunction peripheral (MFP) integrally providing a printer function and a facsimile function, a printer that receives data from a PC or the like and prints the received data (including an electrophotographic printer and an ink jet printer), a scanner, a facsimile, and the like. In FIG. 3, a description will be given of an exemplary case where the image forming apparatus is a multifunction peripheral.

The image forming apparatus 131 includes a document feeding unit 301, an image reader 302, an image forming unit 303, a paper discharging unit 304, a Network I/F 305, a CPU 306, a ROM 307, a RAM 308, an HDD 309, an operation unit 310, and a display unit 311. The respective processing units are connected to each other via a system bus 312 to exchange data. The image reader 302 reads a document at the document feeding unit 301. The image reader 302 and the image forming unit 303 convert the read document and data received via the network into a print image and prints out the image. The paper discharging unit 304 discharges a paper having the printed image thereon and performs sorting processing and stapling processing. The Network I/F 305 is connected to the LAN and the Internet via the network to exchange information with an external apparatus.

The CPU 306 controls the image forming apparatus 131 overall. The CPU 306 monitors the operational status of the image forming apparatus 131. If a specific event such as a failure or the like has occurred, the CPU 306 transmits status information indicating the failure or the like to a predetermined transmission destination. The transmission destination includes the monitoring center host 111, the monitoring device, or the like. The ROM 307 which is a nonvolatile storage unit stores a program and data related to processing executed by the image forming apparatus 131. The rewritable RAM 308 electrically stores temporary data related to processing executed by the image forming apparatus 131. The HDD 309 stores a program and data related to processing executed by the image forming apparatus 131, temporary data, user data transmitted to the image forming apparatus 131, and the like.

The HDD 309 of the image forming apparatus 131 has a program relating to the function units shown in FIG. 5 to be described below. The CPU 201 uses the RAM 308 as a temporal storage region and calls and executed the program stored therein. The operation unit 310 receives an instruction input to the image forming apparatus 131. The display unit 311 displays the operational status of the image forming apparatus 131 and information about an operation to the operation unit 310. Note that the ROM 307 or the HDD 309 of the image forming apparatus 131 that has a function of transmitting information for monitoring the image forming apparatus itself holds a program and data relating to monitor data send-out processing.

<Software>

Figure 4:
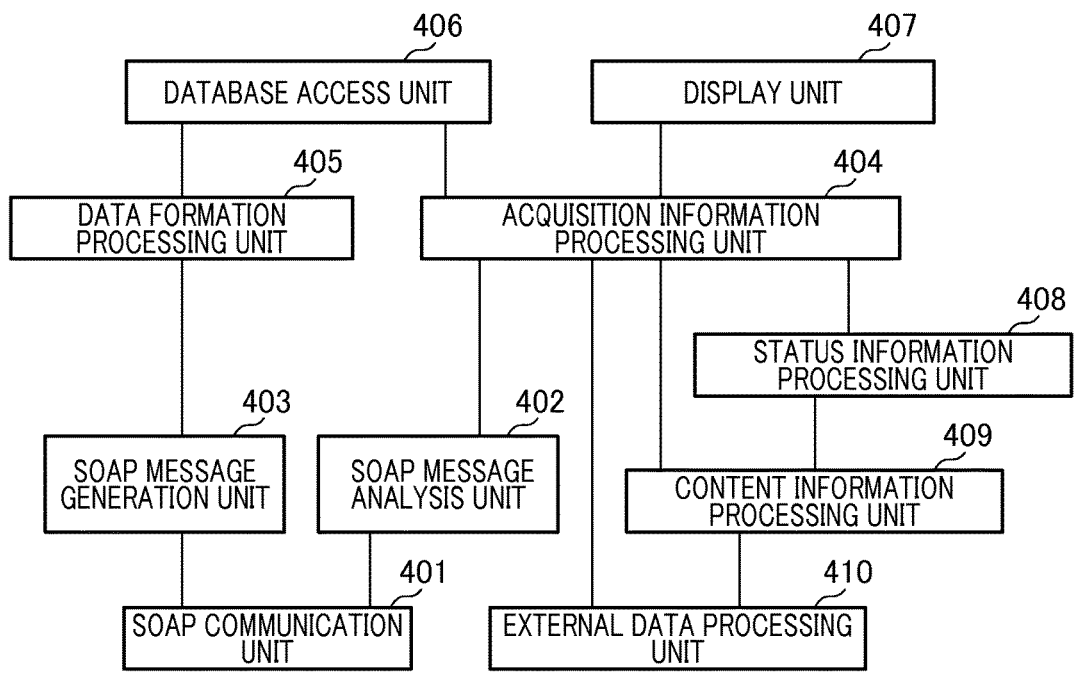
FIG. 4 is a diagram illustrating a software configuration of a communication portion of each of a monitoring center host and a distribution server.

FIG. 4 is a diagram illustrating a software configuration of the distribution server 133. The distribution server 133 includes a SOAP communication unit 401, a SOAP message analysis unit 402, a SOAP message generation unit 403, an acquisition information processing unit 404, a data formation processing unit 405, a database access unit 406, a display unit 407, a status information processing unit 408, a content information processing unit 409, and an external data processing unit 410. The distribution server 133 holds programs of the software configuration units on the ROM 202 and uses the RAM 203 for temporarily storing the acquired data. The CPU 201 of the distribution server 133 controls the processing.

The SOAP communication unit 401 receives SOAP data from the image forming apparatus 131 via the Network I/F 208, and then transfers the received SOAP data to the SOAP message analysis unit 402. Also, the SOAP communication unit 401 transmits SOAP data generated by the SOAP message generation unit 403 to the image forming apparatus 131 via the Network I/F 208.

The acquisition information processing unit 404 directly uses or processes data of the SOAP message analysis unit 402 and stores SOAP data in the database 112 and the database 134 via the database access unit 406. The acquisition information processing unit 404 also performs determination processing (mode-related processing) for determining either a download request from the image forming apparatus 131 or applicability confirmation from the monitoring center host 111 by analyzing firmware data acquired from the database access unit 406. The acquisition information processing unit 404 also judges whether or not the status of firmware is release to the market.

The data formation processing unit 405 acquires data from the database access unit 406, processes the data, and then passes the resulting data to the SOAP message generation unit 403. The display unit 407 displays various types of screens for the operator via the display unit 206 and processes input and output via the operation unit 205. The display unit 407 also stores the processing result obtained from the acquisition information processing unit 404 via the database access unit 406 in the database 112 and the database 134.

The status information processing unit 408 processes status information regarding the market release of firmware of the distribution server 133. For example, the status information processing unit 408 receives a firmware suspension instruction from a sales company, and then changes the status indicating release of the firmware to suspension. The content information processing unit 409 performs processing for table information relating to distribution of firmware content, and the external data processing unit 410 performs processing for Net Storage via the Network I/F 208.

Figure 5:
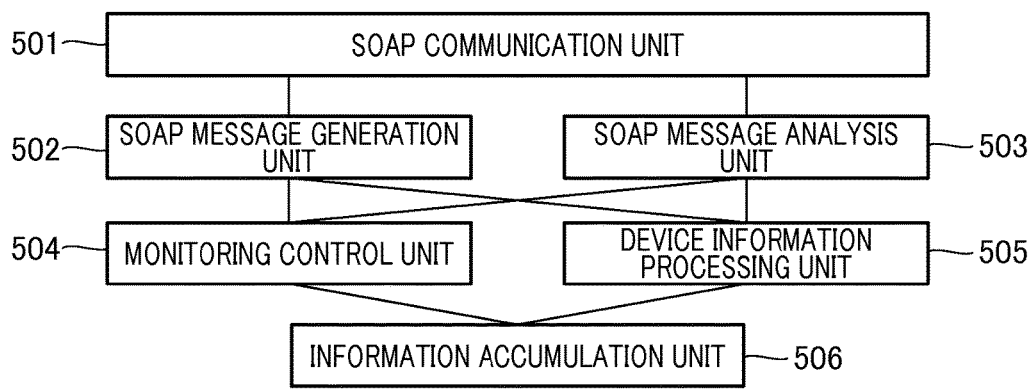
FIG. 5 is a diagram illustrating a software configuration of a communication portion of each of a monitoring device and an image forming apparatus.

FIG. 5 is a diagram illustrating a software configuration of a communication portion of each image forming apparatus. Here, a description will be given by taking an example of the image forming apparatus 131. The image forming apparatus 131 includes a SOAP communication unit 501, a SOAP message generation unit 502, a SOAP message analysis unit 503, a monitoring control unit 504, a device information processing unit 505, and an information accumulation unit 506. The image forming apparatus 131 holds programs of the software configuration units on the ROM 307 and uses the RAM 308 for temporarily storing the acquired data. The CPU 306 of the image forming apparatus 131 controls the processing.

The SOAP communication unit 501 receives SOAP data from the monitoring center host 111 and the distribution server 133 via the Network I/F 308, and then transfers the received SOAP data to the SOAP message analysis unit 503. Also, the SOAP communication unit 501 transmits SOAP data generated by the SOAP message generation unit 502 to the monitoring center host 111 and the distribution server 133 via the Network I/F 308.

The monitoring control unit 504 updates information regarding an image forming apparatus to be monitored and acquires information about the image forming apparatus 131, where such information is held in the information accumulation unit 506. The device information processing unit 505 controls an update operation of the image forming apparatus 131. For example, device information processing unit accepts instruction information such as updating or the like from a user who operates the image forming apparatus 131, and then accumulates it in the information accumulation unit 506. Data accumulated in the information accumulation unit 506 is directly passed to the SOAP message generation unit 502 via the device information processing unit 505, and then is transmitted to the monitoring center host 111 and the distribution server 133 via the Network I/F 308.

Next, a description will be given of firmware package registration processing and firmware update processing performed by the distribution server and the image forming apparatus of the present invention with reference to FIGS. 6 to 22.

Figure 6:
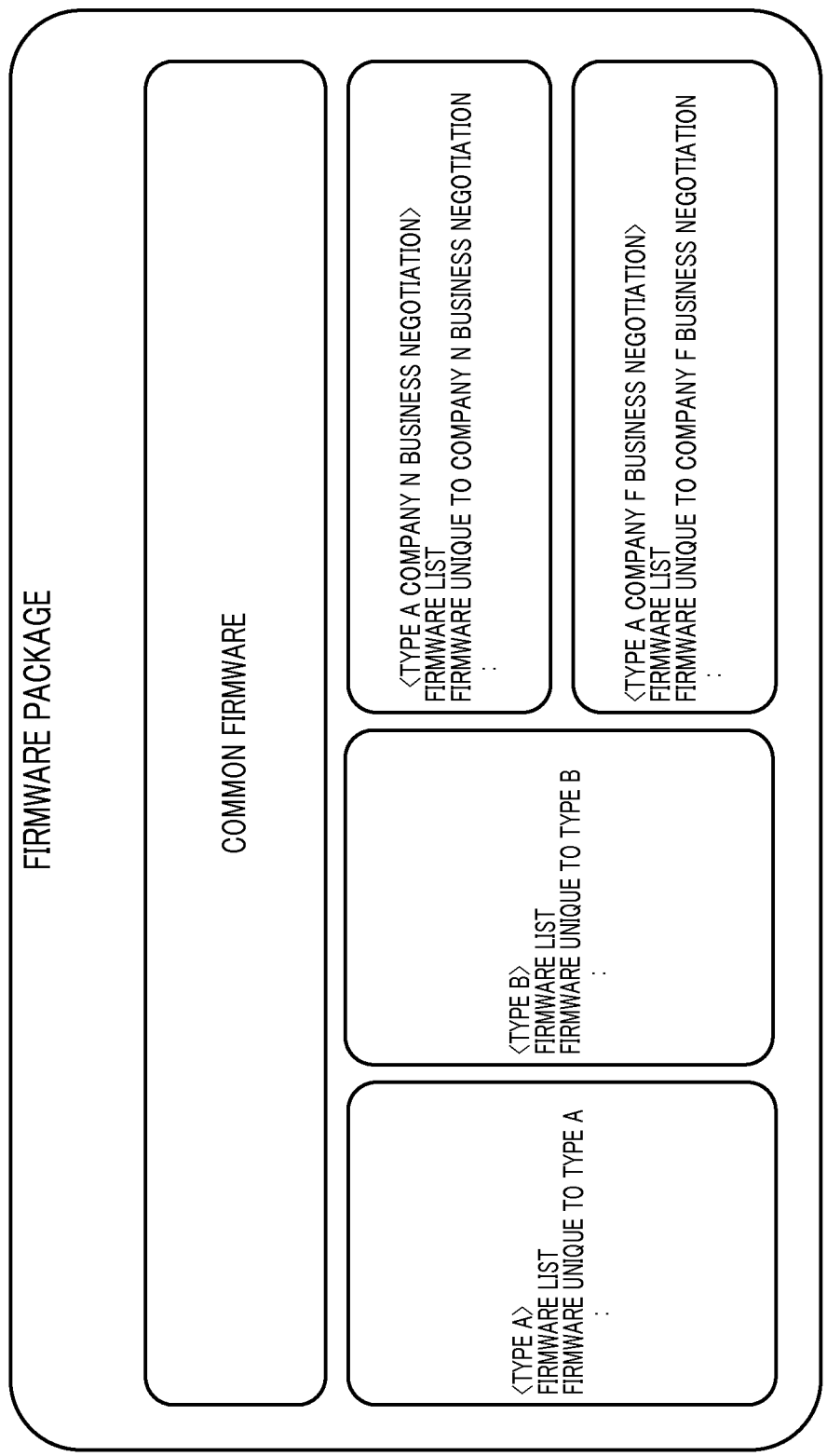
FIG. 6 is an image diagram illustrating a package including a plurality of firmwares.

Firstly, a description will be given of a firmware package with reference to FIG. 6. FIG. 6 shows an example in which a plurality of firmwares is operated as a single package in order to perform firmware management and to reduce a release load. In the example shown in FIG. 6, a firmware package includes firmware which is common to a plurality of types, information about firmware which is unique to each of the plurality of types, and information about special firmware for a specific customer which is unique to each of the plurality of types and is used for the purpose of business negotiation or the like. For example, special firmware is firmware to which an additional function is added in order to meet the demand of a specific company. For example, special firmware is firmware which is released to a very limited extent such as a specific company, a business office, or the like by modifying a specific failure.

These firmwares are allowed to be used only at a specific location and specific operation confirmation by a service person needs to be performed. Thus, these firmwares are typically protected by an identifier, a password, or the like. For the same reason, these firmwares are typically not distributed in a periodic update. Note that normal firmware which is used in an image forming apparatus by a general user or a firmware program itself may also be included in a package.

A description will be given of the overall flow of firmware distribution processing with reference to FIG. 7. Hereinafter, a description will be given by taking an example of the image forming apparatus 131. The hardware and software configuration described above enables information communication among the distribution server 133, the monitoring center host 111, and image forming apparatuses so as to distribute firmware. There are two cases for distributing firmware: one case is that an update instruction (1308) is given from the monitoring center host 111 and the other case is that a service person or an administrator actually visits a location at which an image forming apparatus is installed and provides an instruction through the operation of the screen.

When the screen of the image forming apparatus 131 is operated, a service person or an administrator presses an applicable firmware confirmation button, so that the image forming apparatus 131 confirms the distribution server 133 whether applicable firmware is present (1301). At this time, the image forming apparatus 131 transmits firmware configuration information about the current image forming apparatus to the distribution server 133, and confirms whether or not distributable firmware is present among the firmwares registered in the distribution server 133.

More specifically, the image forming apparatus 131 transmits data shown in FIG. 8 to the distribution server 133. The data shown in FIG. 8 includes an image forming apparatus identifier, a current firmware configuration information list 1401, and acquisition information. Here, the image forming apparatus 131 transmits the image forming apparatus identifier and the current firmware configuration information list 1401 to the distribution server 133. The distribution server 133 recognizes the version of current firmware and applicable firmware based on the firmware configuration information list 1401. If applicable firmware is present, the distribution server 133 transmits data shown in FIG. 9 to the image forming apparatus 131. In the data shown in FIG. 9, applicable firmware is described as a firmware group version 1501 and a firmware label 1502. The image forming apparatus 131 downloads (1302) and updates applicable firmware by selecting the described group version 1501 and firmware label 1502.

By the same sequence, the image forming apparatus 131 polls the monitoring center host 111 at predetermined intervals (1303) to thereby acquire update-related instruction information. The image forming apparatus 131 confirms the distribution server 133 whether applicable firmware is present at a specified time included in instruction information or at intervals preset for the image forming apparatus 131 (1301). If latest firmware is present, the latest firmware is transmitted as the firmware group version 1501 and the firmware label 1502, and then is downloaded and updated. As described above, automatic confirmation/update of applicable firmware from an image forming apparatus to a distribution server without pressing an applicable firmware confirmation button by a service person or an administrator is referred to as a "periodic update".

Figure 19:
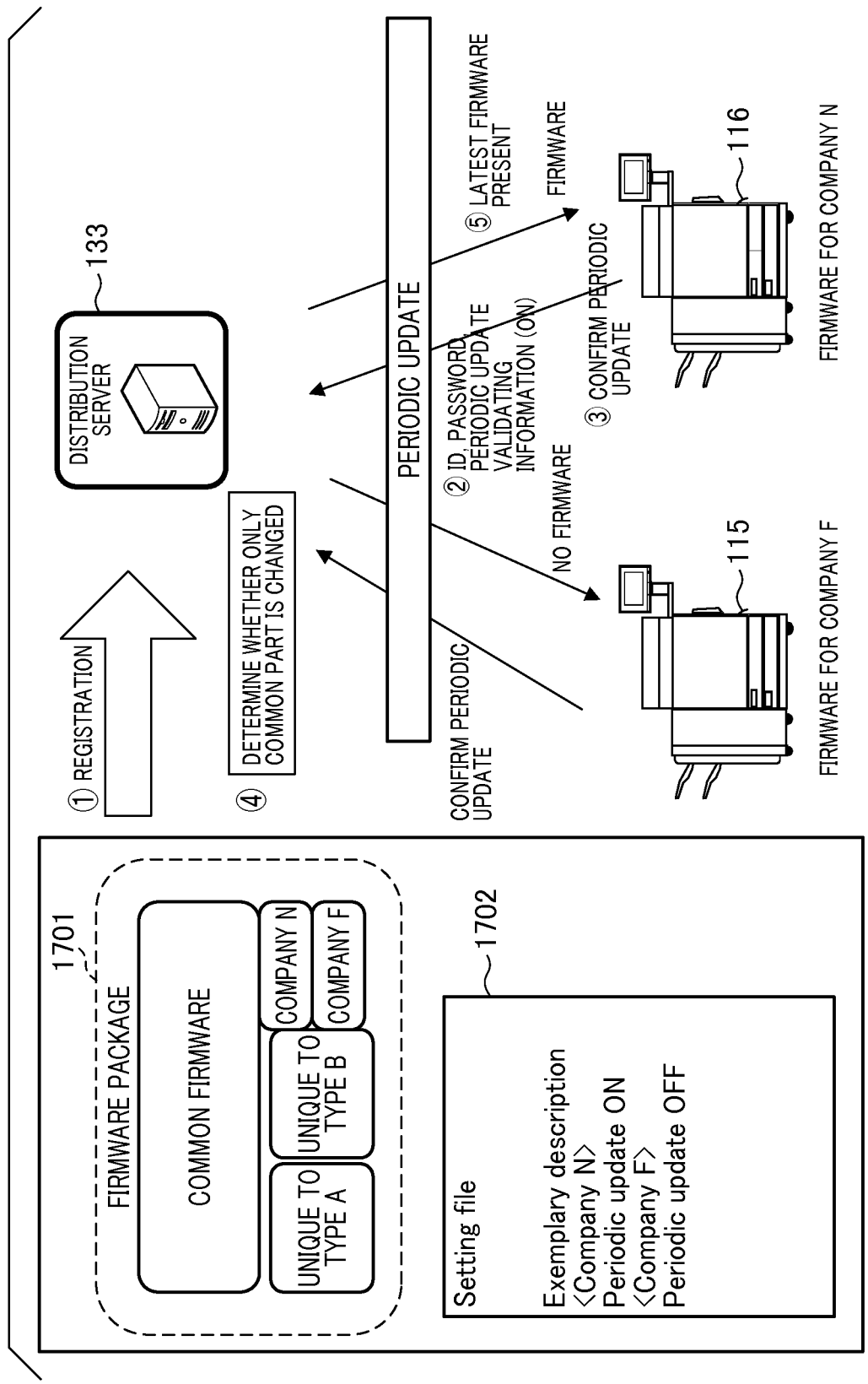
FIG. 19 is a diagram illustrating the flow of processing performed by the entire network system according to a first embodiment.

Next, a description will be given of the processing flow of the present embodiment with reference to FIGS. 11, 12, 13, and 19. As shown in FIG. 19, it is assumed the case where a firmware package 1701 including firmware for company N and firmware for company F and a setting file 1702 are registered in the distribution server 133, and the image forming apparatuses 115 and 116 make a firmware confirmation request. In the example shown in FIG. 19, the image forming apparatus 115 makes a confirmation request for firmware for company F to the distribution server 133 and the image forming apparatus 116 makes a confirmation request for firmware for company N to the distribution server 133.

If a request is received from the image forming apparatus 131 via the SOAP communication unit 401 in step S701, the SOAP message analysis unit 402 of the distribution server 133 analyzes data included in the request. More specifically, the SOAP message analysis unit 402 determines whether the received SOAP message is either applicability confirmation or new confirmation. If the SOAP message analysis unit 402 determines that the request is an applicability confirmation request or a new confirmation request, the status information processing unit 408 acquires the status of target firmware with reference to the table shown in FIG. 10 in step S702. If the request is other than an applicability confirmation request or a new confirmation request, the processing proceeds to step S713, and another processing is performed.

The table shown in FIG. 10 includes a status 601, an operation mode 602, a firmware change status 603, a periodic update 604, and a download 605. The status 601 stores the status whether firmware is released to the market or is suspended in the market on the network. The operation mode 602 stores operation modes such as a manual update, a reserved update by the monitoring center host 111, or a periodic update. The firmware change status 603 stores the status whether individual firmware is updated or only firmware which is common to a plurality of devices is updated. The periodic update 604 stores information such as approval or denial. The download 605 stores Active or Inactive.

The status information processing unit 408 acquires the status 601 of applicable firmware based on the configuration of firmware for which a confirmation request has been made from the table shown in FIG. 10. The status 601 corresponds to either "released to the market" or "suspended in the market". In step S703, the status information processing unit 408 determines whether or not firmware of which the status is released to the market is present. If firmware of which the status is released to the market is present, the acquisition information processing unit 404 performs mode acquisition processing in step S704.

The mode to be acquired herein is a mode indicating a confirmation request made by reservation via the monitoring center host 111 or a mode indicating a confirmation request directly made from the image forming apparatus without through the monitoring center host 111. If the operation mode acquired in step S705 is a request directly made from the image forming apparatus, the processing proceeds to step S706. In step S706, the acquisition information processing unit 404 acquires the action mode as to whether the request from the image forming apparatus is either an automatic confirmation request (periodic update) or a manual confirmation request.

If the request is determined to be the periodic update in step S706, the processing proceeds to step S707, where transfer processing is performed by the content information processing unit 409. In step S707, the content information processing unit 409 acquires firmware type information such as normal firmware, specific firmware for business negotiation or the like as described above. Firmware type information is typically set upon registration of firmware. In step S708, the content information processing unit 409 determines whether or not the type of acquired firmware is specific firmware. In the case of the image forming apparatus 116, the acquired firmware is firmware for company N, and thus the type thereof is determined to be specific firmware. In step S709, the content information processing unit 409 determines whether or not firmware registered as the latest and a periodic update of specific firmware in the image forming apparatus have been approved. The setting method will be described below with reference to FIGS. 12 and 13.

If it is determined that the type of firmware acquired in step S708 is firmware which is common to a plurality of devices, the processing may proceed to step S710 without performing processing in step S709. This is because a periodic update can be performed without the presence of a service person in the case of changing common firmware due to no influence on specification and operation of firmware as specific firmware.

In step S710, the content information processing unit 409 determines whether or not the configuration of firmware of the requestor's image forming apparatus and the configuration of the latest firmware to be passed meet the update condition. For example, if the version of the latest firmware is newer than the version included in the configuration of the requestor's firmware, the update condition is determined to be met. Although the update condition is a fixed setting but may be changed to other conditions. Since firmware applicable to the image forming apparatus 131 is present, the content information processing unit 409 transmits data shown in FIG. 9 in step S712. In this manner, the latest firmware is subsequently downloaded by the image forming apparatus 131.

If it is determined in step S709 that an update is not approved or if it is determined in step S710 that firmware configuration does not meet the update condition, the content information processing unit 409 transmits data shown in FIG. 9 because of the absence of applicable firmware. In this case, the same version as that of firmware notified from the image forming apparatus 131 is reported. A message indicating the absence of applicable firmware may also be reported. In this manner, the subsequent download processing is not performed.

Figure 12:
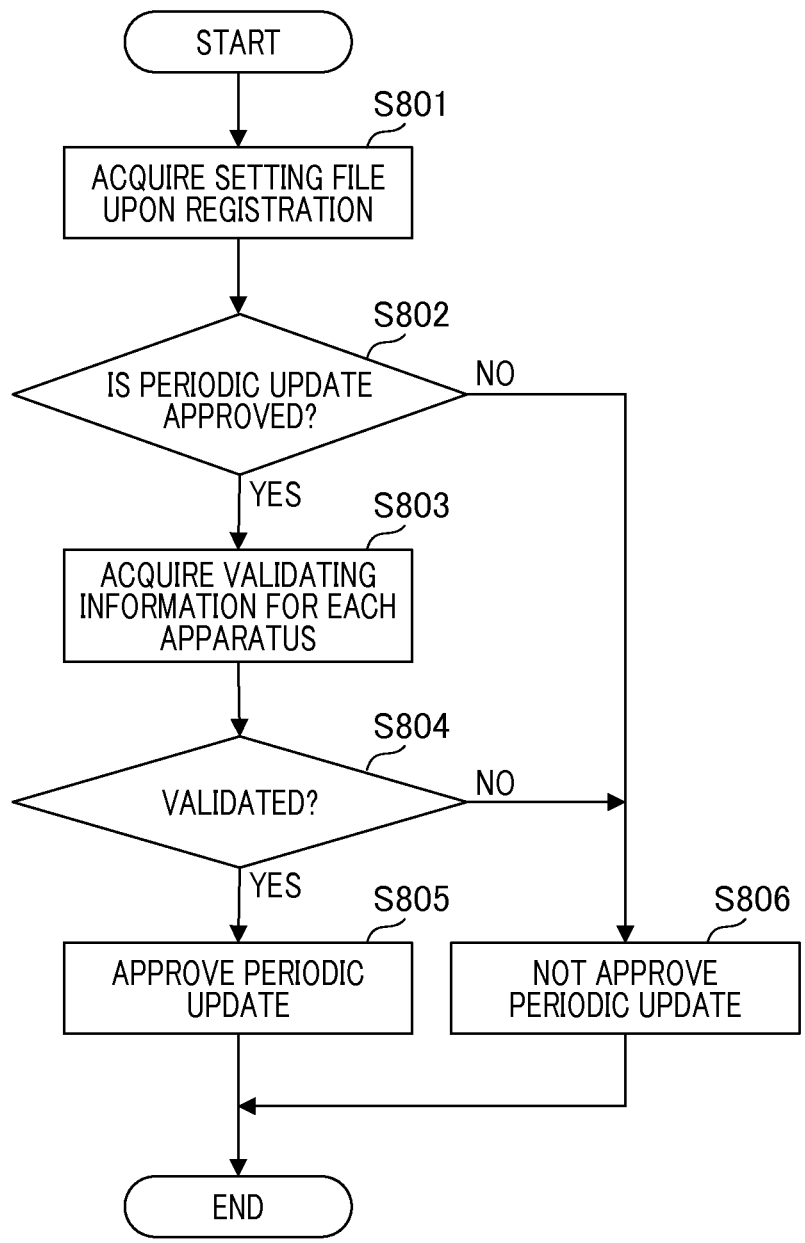
FIG. 12 is a flowchart illustrating update determination processing performed by a distribution server.

FIG. 12 is a flowchart illustrating the flow of approval/denial setting for a periodic update of specific firmware in step S709. The processing shown in FIG. 12 is performed by the content information processing unit 409.

Firstly, in step S801, the content information processing unit 409 acquires approval information obtained upon registration of a firmware package. As shown in FIG. 19, if a firmware package is registered in the distribution server 133, the update-related setting file 1702 concerning is also registered. Either approval or denial of a periodic update of specific firmware for each company business negotiation is described in the setting file 1702. The content information processing unit 409 acquires the setting file. Note that the setting file is stored together with other firmware information. In the example shown in FIG. 19, a periodic update is ON, i.e., approved for firmware for company N business negotiation, whereas a periodic update is OFF, i.e., denied for firmware for company F business negotiation.

In step S802, the content information processing unit 409 determines whether or not a periodic update of firmware to be confirmed is approved based on the setting file. If a confirmation request for firmware provided by company N is made, the content information processing unit 409 determines that a periodic update is approved. In step S803, the content information processing unit 409 acquires validating information indicating whether or not a periodic update is approved from the respective image forming apparatuses. Validating information is transmitted from an image forming apparatus by SOAP communication. The details of setting information acquisition processing will be described below with reference to FIG. 13.

In step S804, the content information processing unit 409 determines whether or not a setting regarding an automatic update of the acquired respective image forming apparatuses is validated, i.e., approved. As shown in FIG. 19, if validating information (ON) about a periodic update is transmitted from the image forming apparatus 116, the content information processing unit 409 determines that a periodic update is validated. Next, the processing proceeds to step S805, and the content information processing unit 409 writes the fact that a periodic update of specific firmware to be confirmed is approved in the image forming apparatus 116 on database. In this manner, it is determined in the processing in step S709 shown in FIG. 11 that a periodic update is approved.

As shown in FIG. 19, if a confirmation request for firmware for company F is made from the image forming apparatus 115, the content information processing unit 409 determines in step S802 that a periodic update is not approved based on the setting file. Then, the processing proceeds to step S806, and the content information processing unit 409 does not approve a periodic update of specific firmware, so that it is determined in step S709 that a periodic update is not approved.

Figure 13:
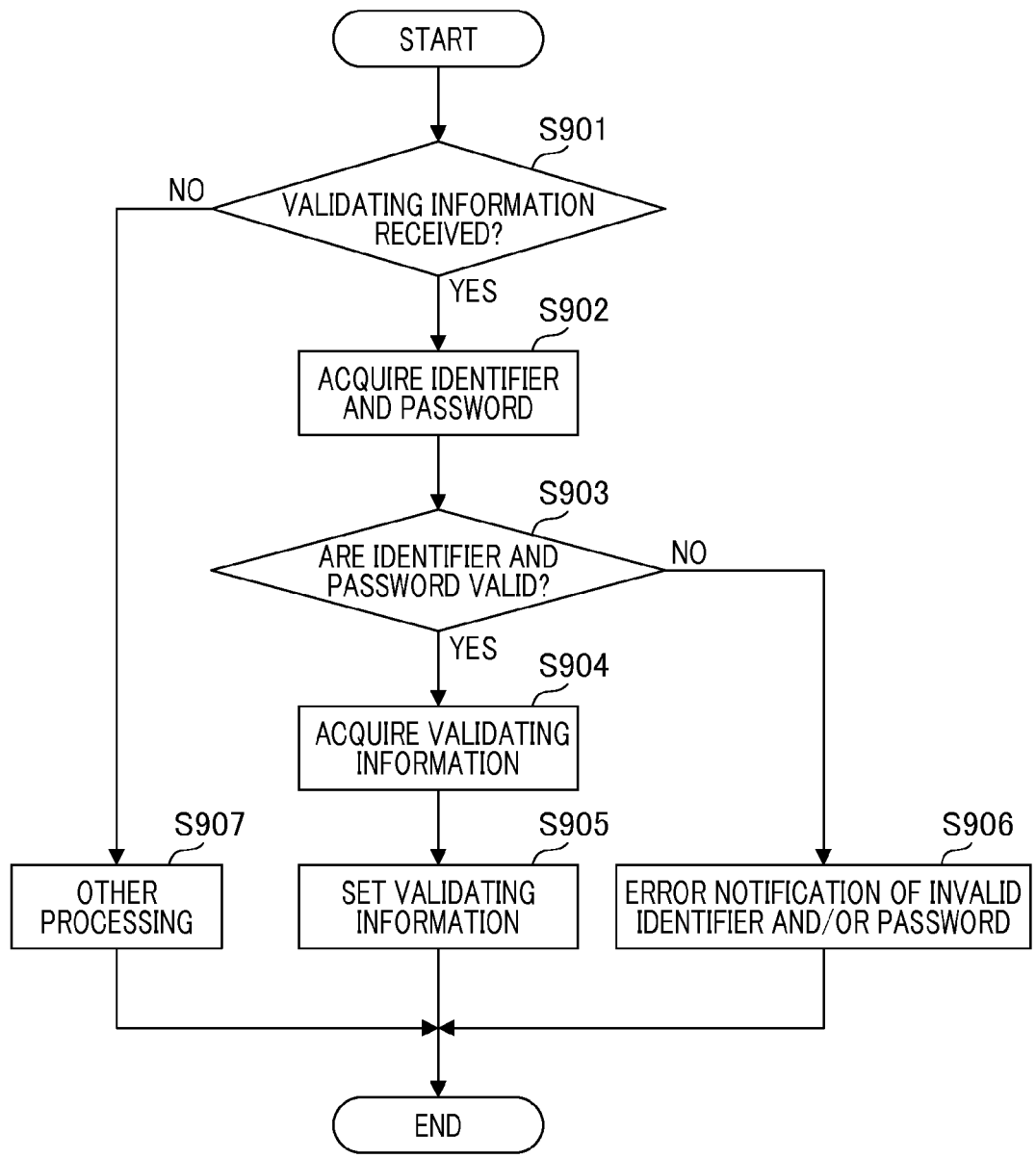
FIG. 13 is a flowchart illustrating validating information acquisition processing performed by a distribution server.

FIG. 13 is a flowchart illustrating processing performed by the distribution server 133 upon reception of validating information. As described above, if a request is received from the image forming apparatus via the SOAP communication unit 401, the SOAP message analysis unit 402 of the distribution server 133 analyzes data included in the request. In step S901, the SOAP message analysis unit 402 determines whether or not validating information has been received.

As shown in FIG. 19, prior to a confirmation request for a periodic update, the image forming apparatus 116 transmits authentication information such as the identifier and password and validating information of the image forming apparatus 116 to the distribution server 133 at any timing. While the above information is transmitted prior to periodic update confirmation processing in the example shown in FIG. 19, the above information may also be transmitted simultaneously with confirmation of a periodic update.

If validating information has been received, the processing proceeds to step S902, and the acquisition information processing unit 404 acquires an identifier and a password. This is because the distribution server 133 requires identifier and password authentication to access specific firmware. In step S903, the acquisition information processing unit 404 determines whether or not the received identifier and password are valid. A service person typically receives a contact about authentication information in advance and inputs the authentication information.

If it is determined in step S903 that authentication information is valid, the processing proceeds to step S904, and the subsequent processing is performed by the content information processing unit 409. In step S904, the content information processing unit 409 acquires validating information about a periodic update of specific firmware transmitted together with the identifier and password. More specifically, ON/OFF information is acquired. As shown in FIG. 19, the image forming apparatus 116 has already transmitted validating information (ON), and thus, the processing proceeds to step S905. In step S905, the content information processing unit 409 sets validating information to the database 134 together with information set upon registration of an image forming apparatus in a distribution server. In this manner, validating information about a periodic update of specific firmware is set from the respective image forming apparatuses.

In the above embodiment, the image forming apparatus 116 transmits validating information (ON) upon making a confirmation request for firmware for company N. However, a service person can make an OFF setting to the respective image forming apparatuses. For example, when the image forming apparatus 115 makes a confirmation request for firmware for company N, the image forming apparatus 115 transmits validating information (OFF) to the distribution server 133 if the OFF setting is made on the image forming apparatus 115 side. In this case, the distribution server 133 controls approval/denial of distribution of firmware in the approval/denial processing for a periodic update of specific firmware in accordance with control information described in the setting file upon registration and ON setting information or OFF setting information about an automatic update. Note that validating information may be changed by the monitoring center host 111 as in a firmware update instruction described above.

As described above, the distribution system of the present invention can register a package including a plurality of firmwares of image forming apparatuses and controls an automatic update of specific firmware based on information indicating whether or not an update of specific firmware is permitted.

Second Embodiment

Figure 20:
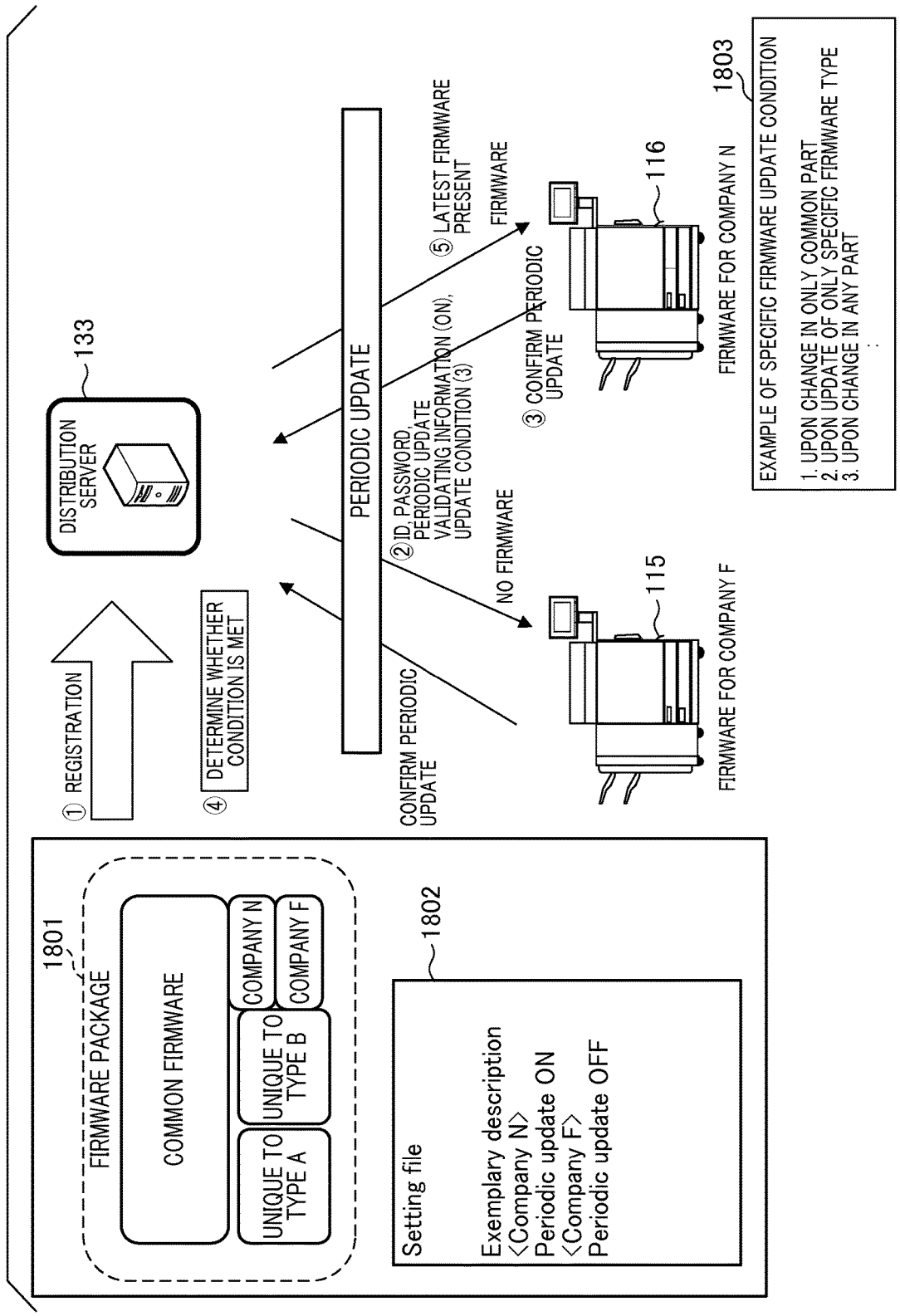
FIG. 20 is a diagram illustrating the flow of processing performed by the entire network system according to a second embodiment.

As another embodiment, it is contemplated that update conditions together with validating information are transmitted from image forming apparatuses to change the update conditions for the respective image forming apparatuses. This operation will be described with reference to FIGS. 14 and 20. As shown in FIG. 20, it is assumed the case where a firmware package 1801 and a setting file 1802 are registered in the distribution server 133, and the image forming apparatuses 115 and 116 make a firmware confirmation request. In the example shown in FIG. 20, the image forming apparatus 115 makes a confirmation request for firmware for company F to the distribution server 133 and the image forming apparatus 116 makes a confirmation request for firmware for company N to the distribution server 133.

At this time, the image forming apparatus 116 transmits a specific firmware update condition 1803 to the distribution server 133 together with validating information (ON). Examples of an automatic update of specific firmware include 1. upon change in only a common part, 2. upon update of only the type of specific firmware, 3. upon change in any part of specific firmware, and the like. Here, the update condition 3 is transmitted. If the update condition 1 is transmitted from the image forming apparatus to the distribution server 133, a periodic update is approved only upon change in firmware which is common to a plurality of types. If the update condition 2 is transmitted, a periodic update of only the specific type of specific firmware (e.g., type A, type B, or the like of firmware for company N) is approved. Thus, if the update condition 2 is transmitted, a periodic update is not approved upon change in common firmware. If the update condition 3 is transmitted, a periodic update of specific firmware including common firmware is approved.

Figure 14:
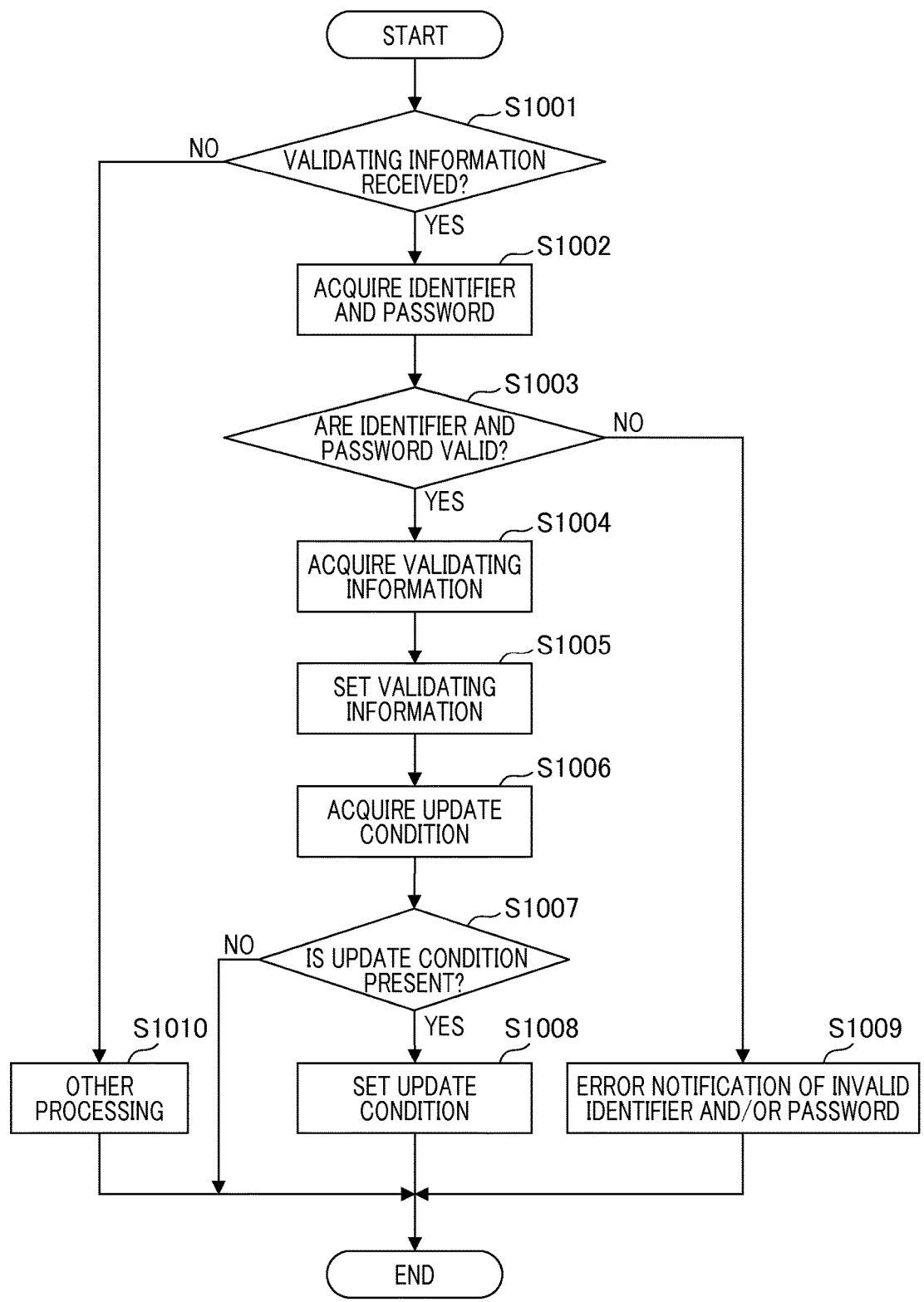
FIG. 14 is a flowchart illustrating validating information and update condition acquisition processing.
Figure 15:
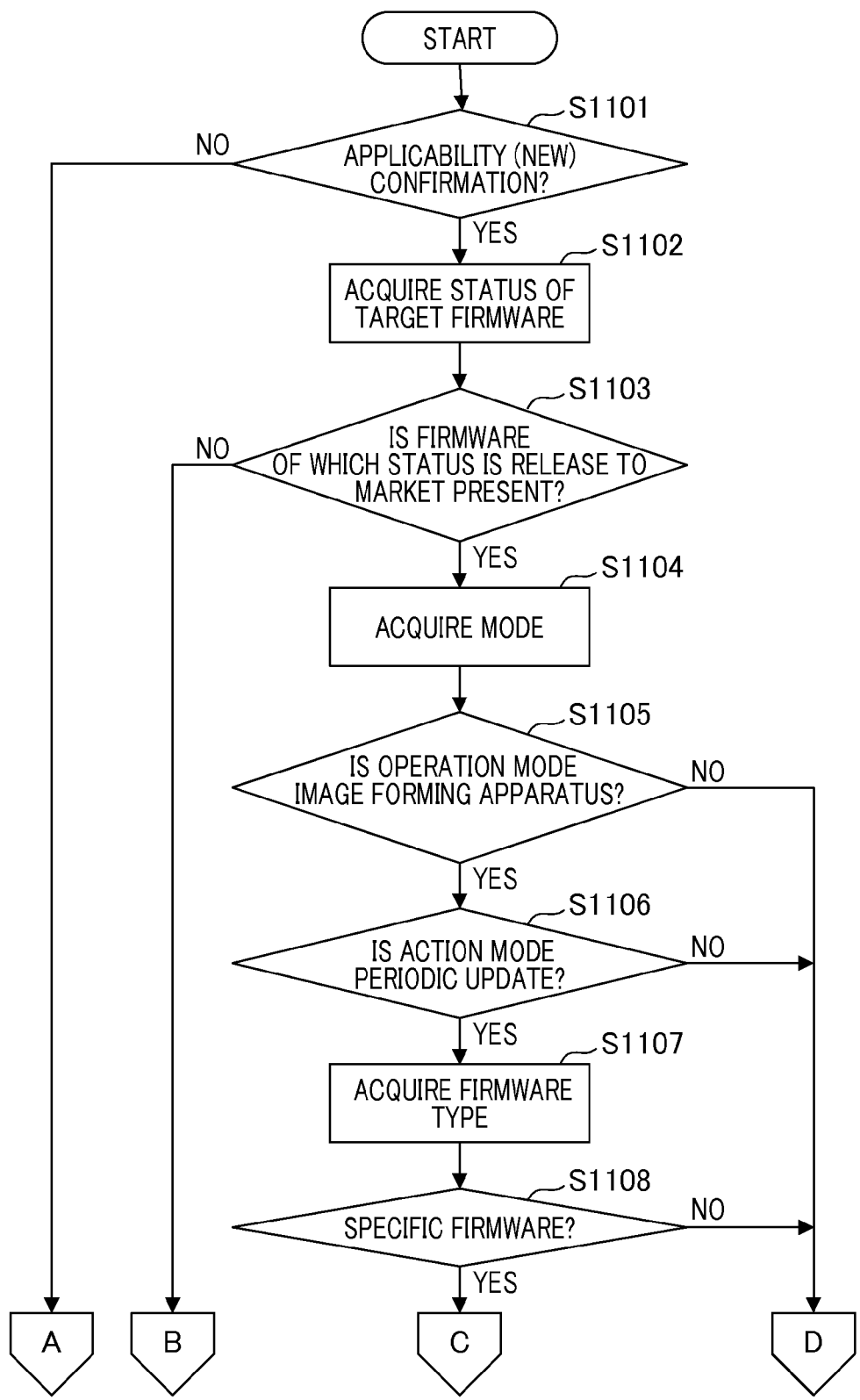
FIG. 15 is a flowchart illustrating forced update determination processing performed by a distribution server.
Figure 16:
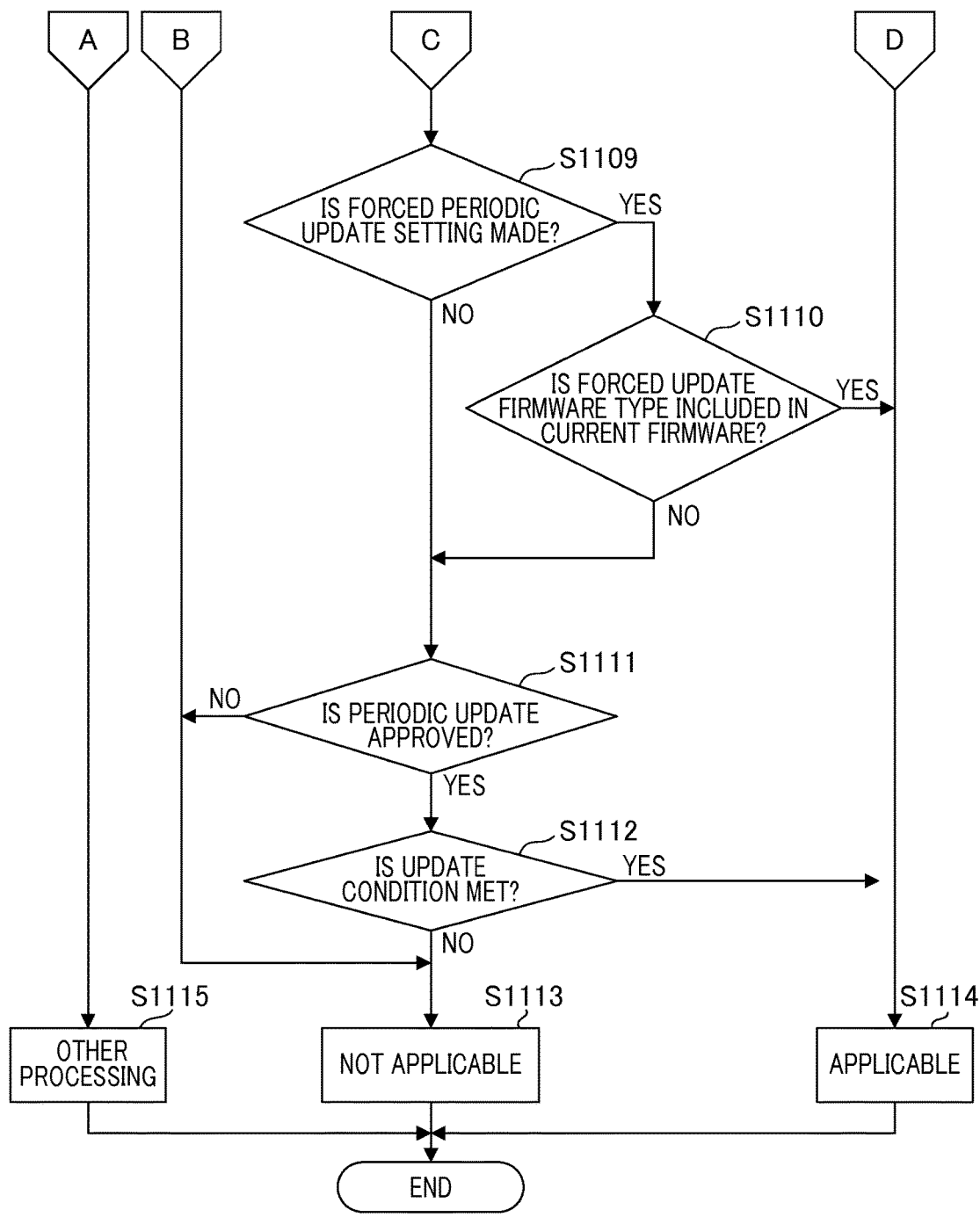
FIG. 16 is a flowchart illustrating forced update determination processing performed by a distribution server.
Figure 17:
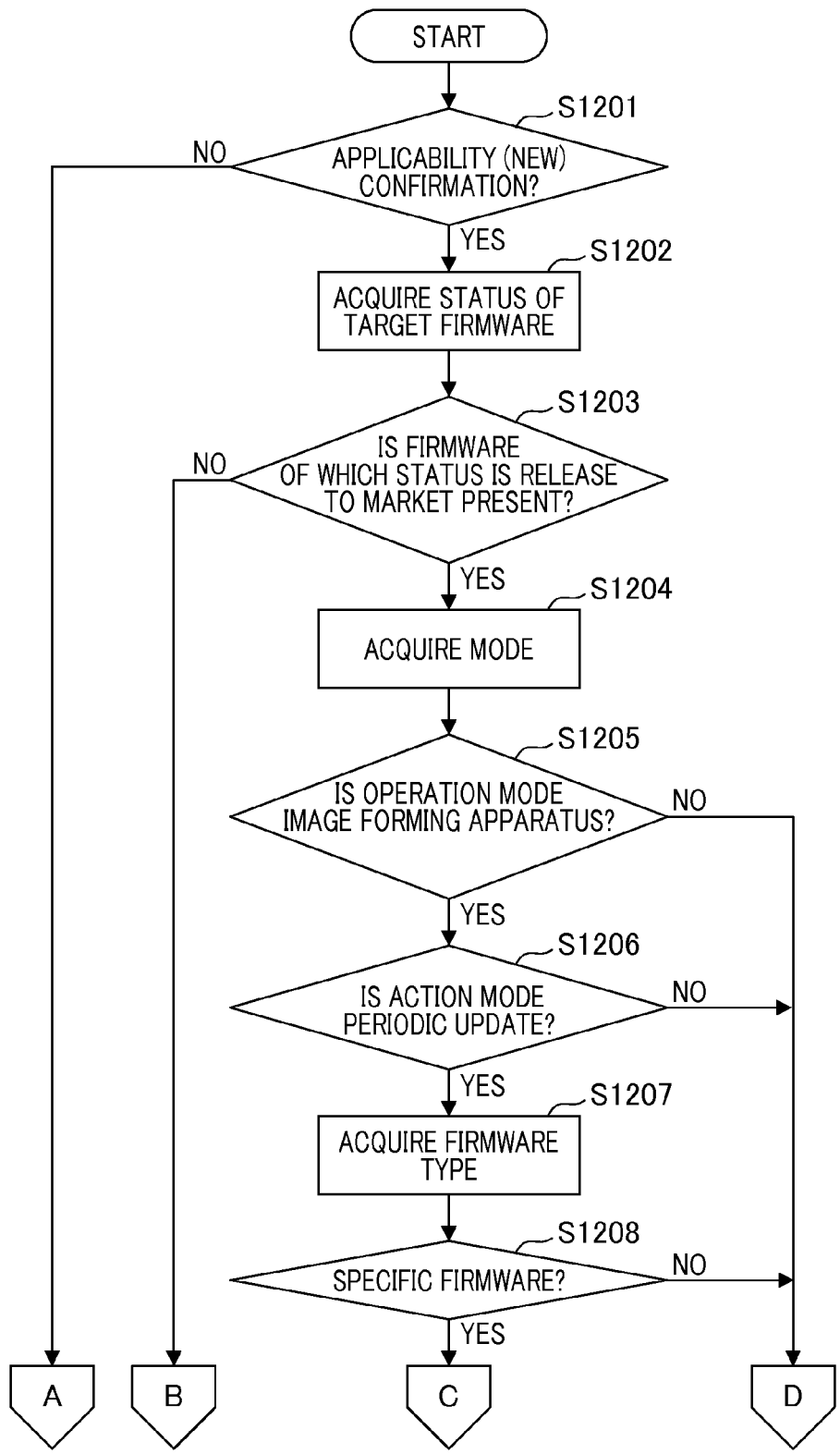
FIG. 17 is a flowchart illustrating update history acquisition processing performed by a distribution server.
Figure 18:
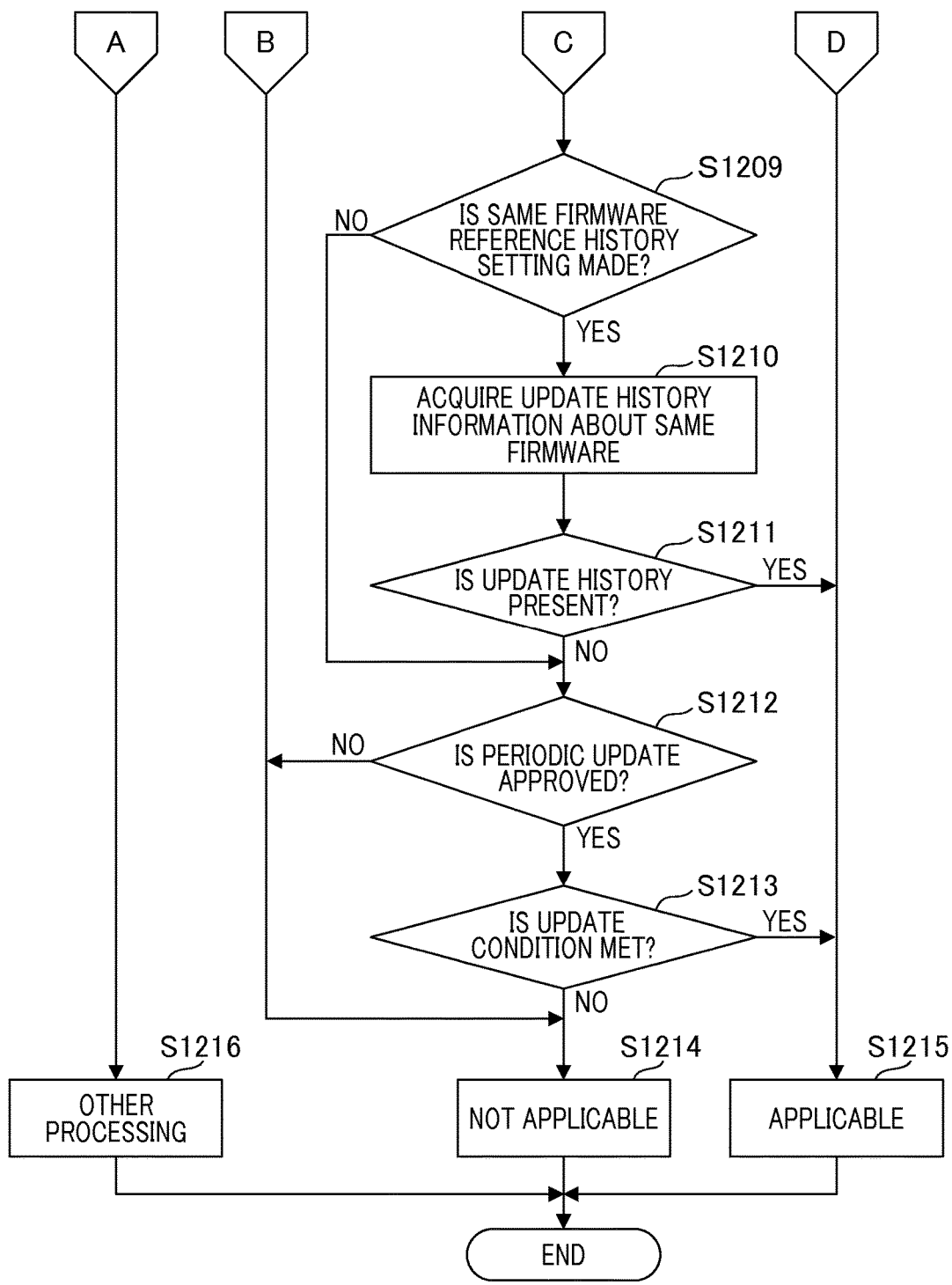
FIG. 18 is a flowchart illustrating update history acquisition processing performed by a distribution server.

FIG. 14 is a flowchart illustrating processing performed by the distribution server 133 upon reception of validating information and an update condition. If a request is received from the image forming apparatus via the SOAP communication unit 401, the SOAP message analysis unit 402 of the distribution server 133 analyzes data included in the request. Here, as in the first embodiment, the SOAP message analysis unit 402 firstly determines whether or not validating information has been received in step S1001. The image forming apparatus can transmit validating information with an update condition added as a transmission parameter of validating information.

If it is determined in step S1001 that validating information has been received, the processing proceeds to step S1002, the acquisition information processing unit 404 acquires authentication information such as an identifier and a password. This is because the distribution server 133 requires identifier and password authentication to access specific firmware. In step S1003, the acquisition information processing unit 404 determines whether or not the received identifier and password are valid. A service person usually receives a contact about authentication information in advance and inputs the authentication information.

If it is determined in step S1003 that authentication information is valid, the processing proceeds to step S1004, and the subsequent processing is performed by the content information processing unit 409. In step S1004, the content information processing unit 409 acquires validating information about a periodic update of specific firmware transmitted together with the identifier and password. More specifically, ON/OFF information is acquired. As shown in FIG. 20, the image forming apparatus 116 has already transmitted validating information (ON), and thus, the processing proceeds to step S1005. In step S1005, the content information processing unit 409 sets validating information to the database 134 together with information set upon registration of the image forming apparatus 116 in a distribution server. In this manner, validating information about a periodic update of specific firmware is set from the respective image forming apparatuses.

In step S1006, the content information processing unit 409 acquires the update condition received from the image forming apparatus 116 together with validating information. Here, the update condition 3 indicating that specific firmware is updated without limiting the change in any part thereof is acquired. Thus, it is determined in the next step S1007 that the update condition is present, and the processing proceeds to step S1008. In step S1008, the content information processing unit 409 sets the update condition 3 in database as in validating information. In this manner, a periodic update of specific firmware can be individually set for each image forming apparatus.

Third Embodiment

As another embodiment, it is contemplated that a periodic update of specific firmware is forcedly performed without limiting the approval or the update condition of a periodic update of specific firmware upon confirmation from an image forming apparatus including a vulnerable firmware type. This operation will be described with reference to FIGS. 15, 16, and 21.

Figure 21:
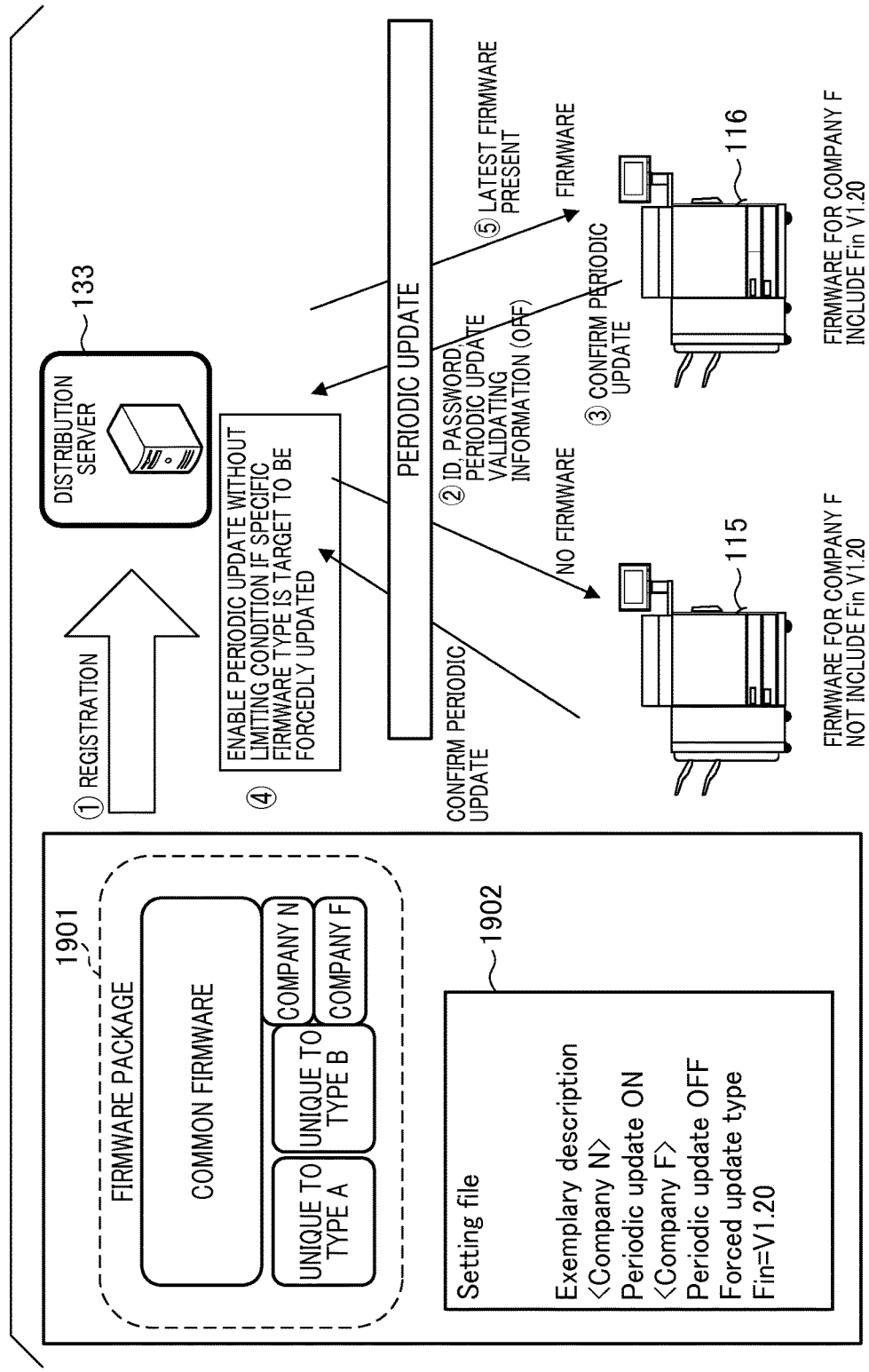
FIG. 21 is a diagram illustrating the flow of processing performed by the entire network system according to a third embodiment.

As shown in FIG. 21, it is assumed the case where a firmware package 1901 and a setting file 1902 are registered in the distribution server 133, and the image forming apparatuses 115 and 116 make a confirmation request for firmware for company F. In the third embodiment, approval/denial of an automatic update for each firmware and for each version of firmware is described in the setting file 1902. In this example, Fin=V1.20 is set as a type of firmware to be forcedly updated upon registration of the setting file 1902. The image forming apparatus 116 includes firmware type Fin V1.20 for company F but the image forming apparatus 115 does not include Fin V1.20.

If a confirmation request is made, the processing for determining whether or not the type of acquired firmware is specific firmware in step S1108 is performed after the processing for determining either applicability confirmation or new confirmation in step S1101 by the same flow as that of the first embodiment. Here, the content information processing unit 409 determines in step S1108 that the type of acquired firmware is specific firmware because of a confirmation request for firmware for company F, and the processing proceeds to step S1109 shown in FIG. 16.

In step S1109, the content information processing unit 409 determines whether or not a forced periodic update of specific firmware has been set in the setting file 1902 upon registration. Fin=V1.20 is set as a type of firmware to be forcedly periodically updated in the setting file 1902. Thus, the processing proceeds to step S1110, and the content information processing unit 409 determines whether or not the type of firmware to be forcedly updated is included in firmware for company F for which a confirmation request has been made. If a confirmation request is made from the image forming apparatus 116, the processing proceeds to step S1114 because Fin V1.20 is included in firmware for company F, so that the content information processing unit 409 determines that applicable firmware is present. In other words, the content information processing unit 409 transmits data shown in FIG. 9 to the image forming apparatus 116. In this manner, the latest firmware is subsequently downloaded to the image forming apparatus 116.

If a confirmation request is made from the image forming apparatus 115 in step S1110, the processing proceeds to step S1111 because Fin V1.20 is not included in firmware for company F. In step S1111, the content information processing unit 409 determines whether or not a periodic update of specific firmware is approved. Since the image forming apparatus 115 makes a confirmation request for firmware for company F, the content information processing unit 409 determines that a periodic update is not approved based on the setting file 1902. Thus, the processing proceeds to step S1113, and the content information processing unit 409 determines that no applicable firmware is present.

By the series of processing, if vulnerable type or version of firmware is known, a periodic update of specific firmware can be forcedly performed without limiting the approval or the update condition of a periodic update of specific firmware.

Fourth Embodiment

Figure 22:
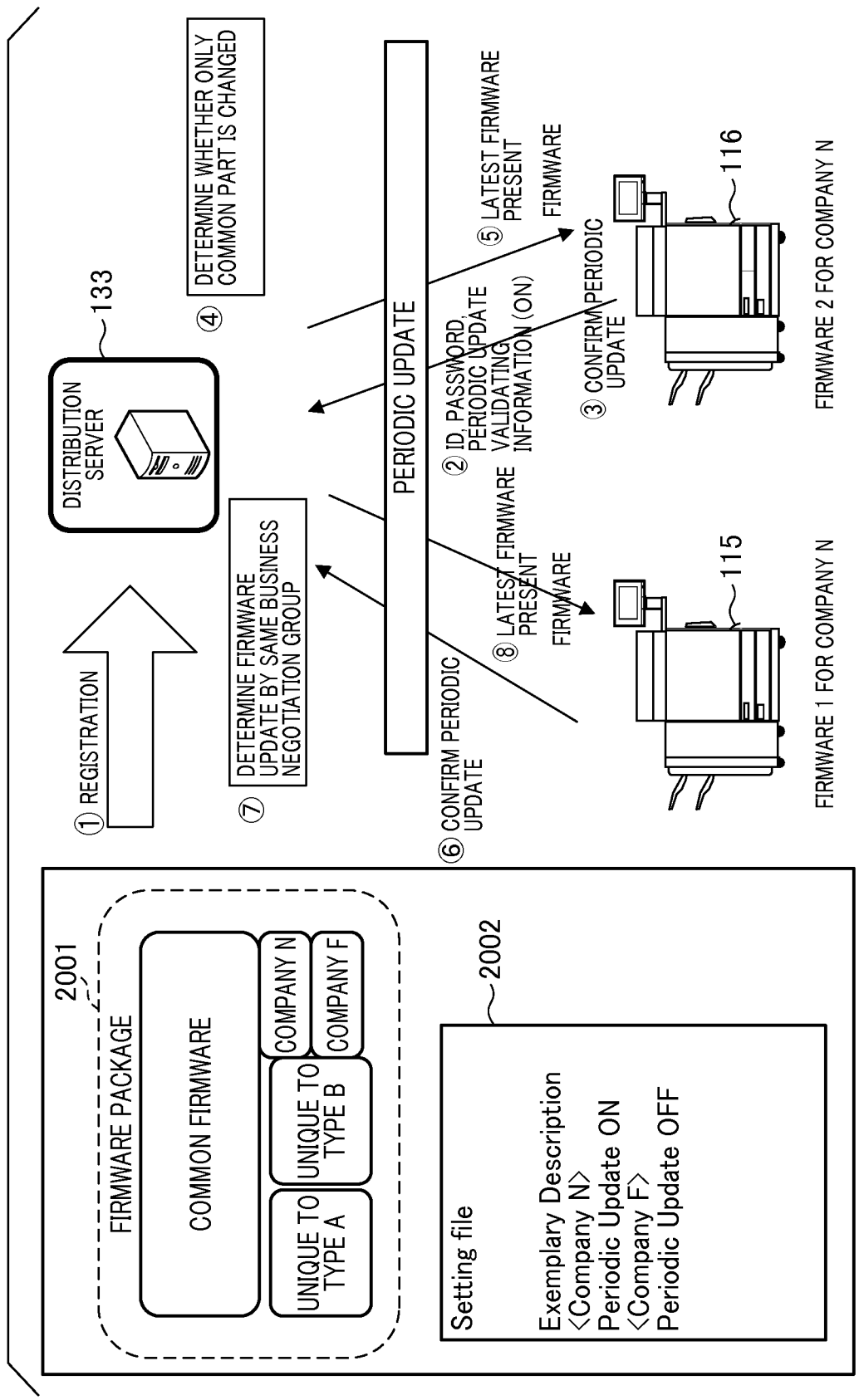
FIG. 22 is a diagram illustrating the flow of processing performed by the entire network system according to a fourth embodiment.

As another embodiment, it is contemplated that the same business negotiation group may perform a periodic update with reference to the update history of other image forming apparatus even if there is no validating information about the image forming apparatus therefor. This operation will be described with reference to FIGS. 17, 18, and 22. As shown in FIG. 22, it is assumed the case where a latest firmware package 2001 including a plurality of firmwares and a setting file 2002 are registered in the distribution server 133, and the image forming apparatuses 115 and 116 make a confirmation request for firmware for company N. It is also assumed the case where the image forming apparatus 116 performs a periodic update of firmware for company N and the image forming apparatus 115 attempts to perform a periodic update. As in the above embodiments, a periodic update of specific firmware for company N is set to ON in the setting file 2002 upon registration.

If a confirmation request is made, the processing for determining whether or not the type of acquired firmware is specific firmware in step S1208 is performed after the processing for determining either applicability confirmation or new confirmation in step S1201 by the same flow as that of the above embodiments. Here, the content information processing unit 409 determines in step S1208 that the type of acquired firmware is specific firmware because of a confirmation request for firmware for company N, and the processing proceeds to step S1209 shown in FIG. 18.

In step S1209, the content information processing unit 409 determines whether or not the same firmware reference history setting is made. Upon referencing the history of the same business negotiation specific firmware, the distribution server 133 sets its approval in the distribution server 133 (option setting in database). In this manner, selection is made as to whether or not the same business negotiation specific firmware is referenced. If the reference history setting is made in step S1209, the processing proceeds to step S1210, and the content information processing unit 409 acquires firmware distribution history information.

In step S1211, the content information processing unit 409 determines whether or not there is distribution or update history of specific firmware for which a confirmation request has been made based on the firmware distribution history information of the distribution server 133. As has been described with reference to FIG. 22, the image forming apparatus 116 has already performed a periodic update of firmware for company N, and thus, it is determined that there is an update history. Thus, the processing proceeds to step S1215, the content information processing unit 409 determines that applicable firmware is present and transmits data shown in FIG. 9 to the image forming apparatus 115. In this manner, the latest firmware is subsequently downloaded to the image forming apparatus 115. By the series of processing, even if no validating information about the image forming apparatuses is transmitted, a periodic update of specific firmware can be performed using the update history of other image forming apparatus in the same business negotiation group.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-008078, filed on Jan. 20, 2014, which is hereby incorporated by reference wherein in its entirety.

What is claimed is:

1. A distribution system comprising:
a first acceptance unit of a management unit configured to accept registration of an updated firmware package corresponding to a plurality of different types of devices, the firmware package contains programs including information about 1) common firmware which is common to the plurality of types of network devices, 2) unique firmware that is specific to a type of a plurality of types of network devices, and 3) special firmware which is unique to a customer and specific to a type of a plurality of types of network devices;
a second acceptance unit of the management unit configured to accept registration of a setting file describing control information for controlling approval or denial of automatic updates to a special firmware included in the firmware package, said control information includes an indicator stating if the special firmware allows periodic updates;
a third acceptance unit of the management unit configured to accept an update request for the special firmware, from a network device containing special firmware, wherein the update request includes setting information related to the network device, the setting information comprises authentication information and an identifier that indicates if the automatic update is a periodic update;

the management unit configured to manage information indicating approval or denial of periodic distribution of firmware in accordance with control information described in the setting file and the setting information, by comparing the control information in the setting file and setting information, wherein the periodic distribution is approved if setting information is authenticated as coming from a reliable source and the control information and setting information both indicate an identifier stating periodic updates are approved for the requested special firmware, and the periodic distribution is denied if the authentication fails or the control information and setting information do not both indicate periodic distribution is approved; and a control unit configured to distribute special firmware which is updatable when the management unit indicates approval of the periodic distribution of the special firmware and to transmit the registered special firmware to the network device.

2. The distribution system according to claim 1, wherein the management unit further manages release and suspension of the respective firmware included in the firmware package on a network.

3. The distribution system according to claim 1, wherein the management unit manages information about approval/denial of distribution of firmware of each of the common firmware and firmware which is unique to each of the plurality of types of network devices.

4. The distribution system according to claim 1, wherein the third acceptance unit accepts authentication information about a service person who manages the special firmware together with the setting information.

5. The distribution system according to claim 1, wherein information about the firmware includes a firmware program.

6. The distribution system according to claim 1, wherein the third acceptance unit accepts the setting information when a request regarding an update of the special firmware is received from the network device to which the special firmware is applied, and the management unit manages information about approval or denial of distribution of the common firmware in accordance with control information described in the setting file without accepting the setting information by the third acceptance unit when a request regarding an update of the common firmware is received from the network device to which the special firmware is applied.

7. The distribution system according to claim 1, wherein the third acceptance unit accepts an update condition of firmware together with the setting information, and the management unit disables the distribution despite the fact that approval of distribution of the special firmware is described in the setting file and the setting information when the update condition indicates that only the common firmware is to be automatically updated, whereas the management unit disables the automatic update of the common firmware when the update condition indicates that only the specific type of the special firmware is to be automatically updated, and controls information about approval/denial of distribution of the firmware.

8. The distribution system according to claim 1, wherein approval or denial of the automatic update for each firmware and each version of the firmware is descried in the setting file, and the management unit manages information about firmware under a version in which a forced update is set from among firmware for which the automatic update is denied as distribution information.

9. The distribution system according to claim 1, wherein, when the management unit manages information indicating that the special firmware is distributable and a request regarding an update of the special firmware is accepted from another network device, the control unit controls to distribute information about the applicable special firmware without accepting the setting information from the another network device.

10. The distribution system according to claim 1, wherein, when the management unit manages information indicating that the special firmware is not distributable in accordance with control information described in the setting file and the setting information, the special firmware is manually updated.

11. A control method in a distribution system, the method comprising:

accepting registration of an updated firmware package corresponding to a plurality of different types of devices, the firmware package contains programs including information about 1) common firmware which is common to the plurality of types of network devices, 2) unique firmware that is specific to a type of a plurality of types of network devices, and 3) special firmware which is unique to a customer and specific to a type of a plurality of types of network devices;

accepting registration of a setting file describing control information for controlling approval or denial of automatic updates to a special firmware included in the firmware package, said control information includes an indicator stating if the special firmware allows periodic updates;

accepting an update request for the special firmware, from a network device containing special firmware, wherein the update request includes setting information related to the network device, the setting information comprises authentication information and an identifier that indicates if the automatic update is a periodic update;

managing information indicating approval or denial of periodic distribution of firmware in accordance with control information described in the setting file and the setting information, by comparing the control information in the setting file and setting information, wherein the periodic distribution is approved if setting information is authenticated as coming from a reliable source and the control information and setting information both indicate an identifier stating periodic updates are approved for the requested special firmware, and the periodic distribution is denied if the authentication fails or the control information and setting information do not both indicate periodic distribution is approved; and controlling to distribute special firmware which is updatable when, in the managing, approval of the periodic distribution of the special firmware is indicated and to transmit the registered special firmware to the network device.

* * * * *